(12) United States Patent
Leopold

(10) Patent No.: US 10,759,517 B2
(45) Date of Patent: Sep. 1, 2020

(54) SYSTEM AND METHOD FOR MODIFYING THE LOCATION OF WATER IMPINGEMENT LIMITS ON AN AIRFOIL

(71) Applicant: The Boeing Company, Chicago, IL (US)

(72) Inventor: David D. Leopold, Seattle, WA (US)

(73) Assignee: The Boeing Company, Chicago, IL (US)

( * ) Notice: Subject to any disclaimer, the term of this patent is extended or adjusted under 35 U.S.C. 154(b) by 420 days.

(21) Appl. No.: 15/839,545

(22) Filed: Dec. 12, 2017

(65) Prior Publication Data
US 2019/0176965 A1 Jun. 13, 2019

(51) Int. Cl.
| B64C 13/16 | (2006.01) |
| B64D 15/00 | (2006.01) |
| G05D 1/08  | (2006.01) |
| B64C 9/00  | (2006.01) |

(52) U.S. Cl.
CPC .............. *B64C 13/16* (2013.01); *B64D 15/00* (2013.01); *G05D 1/0808* (2013.01); *B64C 2009/005* (2013.01); *B64C 2230/00* (2013.01)

(58) Field of Classification Search
CPC .............. B64C 13/16; B64C 2009/005; B64C 2230/00; G05D 1/0808; B64D 15/00
See application file for complete search history.

(56) References Cited

U.S. PATENT DOCUMENTS

| 5,488,375 A | 1/1996 | Michie |
| 5,823,479 A | 10/1998 | Nield |
| 8,781,653 B2 | 7/2014 | Buchholz |
| 2012/0207589 A1* | 8/2012 | Fridthjof ................ B64D 15/20 415/121.3 |
| 2014/0369851 A1* | 12/2014 | Lim ....................... B29C 59/022 416/241 R |
| 2015/0120092 A1* | 4/2015 | Renno ................. G01N 21/3554 701/3 |

(Continued)

FOREIGN PATENT DOCUMENTS

WO    WO2015060899    4/2015

OTHER PUBLICATIONS

Papadakis, "Large and Small Droplet Impingement Data on Airfoils and Two Simulated Ice Shapes," Oct. 2007.

(Continued)

*Primary Examiner* — Marthe Y Marc-Coleman

(57) ABSTRACT

A system for modifying a location of a water impingement limit on an airfoil of an aircraft includes a flight control computer configured to receive data representative of environmental parameters in an environment of a flight path of an aircraft, determine, based on the environmental parameters, an existence of icing conditions to which the aircraft is currently subjected or is predicted to be subjected, and generate, based on the existence of icing conditions, a command signal for actuating a movable surface of the aircraft. The system further includes a surface actuator configured to receive the command signal from the flight control computer and adjust the movable surface in a manner causing an increase in an angle of attack of the airfoil to thereby modify a water impingement limit on the airfoil.

20 Claims, 12 Drawing Sheets

(56) References Cited

U.S. PATENT DOCUMENTS

2017/0158336 A1 6/2017 Meis
2017/0277185 A1 9/2017 Duda

OTHER PUBLICATIONS

Federal Aviation Administration, 14 CFR (FAR) Part, 25, Appendix C, available at <https://www.ecfr.gov/cgi-bin/text-idx?node=14:1.0.1.3.11>, retrieved on Nov. 19, 2017.
Federal Aviation Administration, 14 CFR (FAR) Part, 25, Appendix O, available at <https://www.ecfr.gov/cgi-bin/text-idx?node=14:1.0.1.3.11>, retrieved on Nov. 18, 2017.
Dasilveira et al: "Evaluation of Collection Efficiency Methods for Icing Analisys", Nov. 14, 2003, XP055583022, Retrieved from the Internet: URL: http://www.sinmec.ufsc.br/site/arquivo s/f-fvsbyjksob_2003_silveira_cobem.pdf [retrieved on Apr. 24, 2019].
EPO, Extended European Search Report, Appl. No. 18204985.8, dated May 6, 2019.

\* cited by examiner

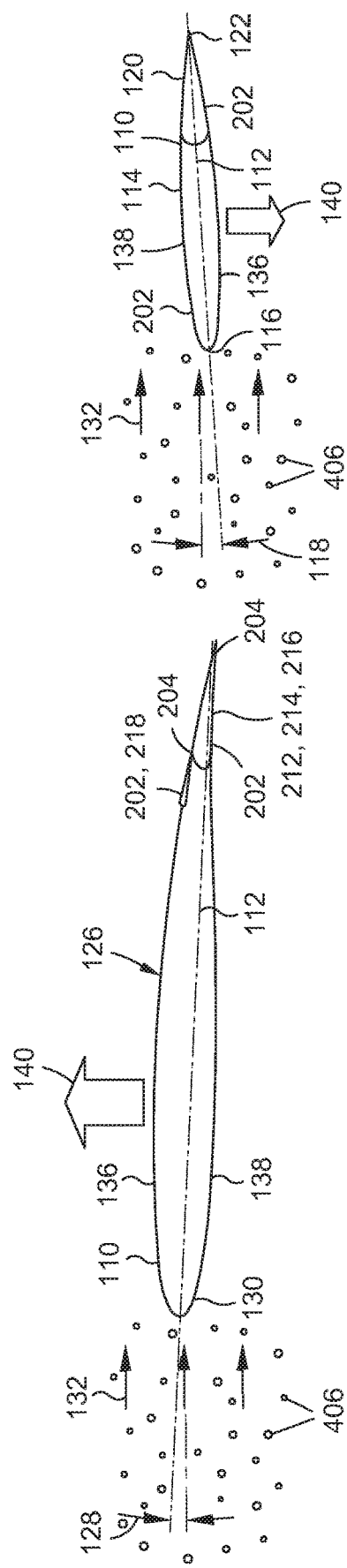

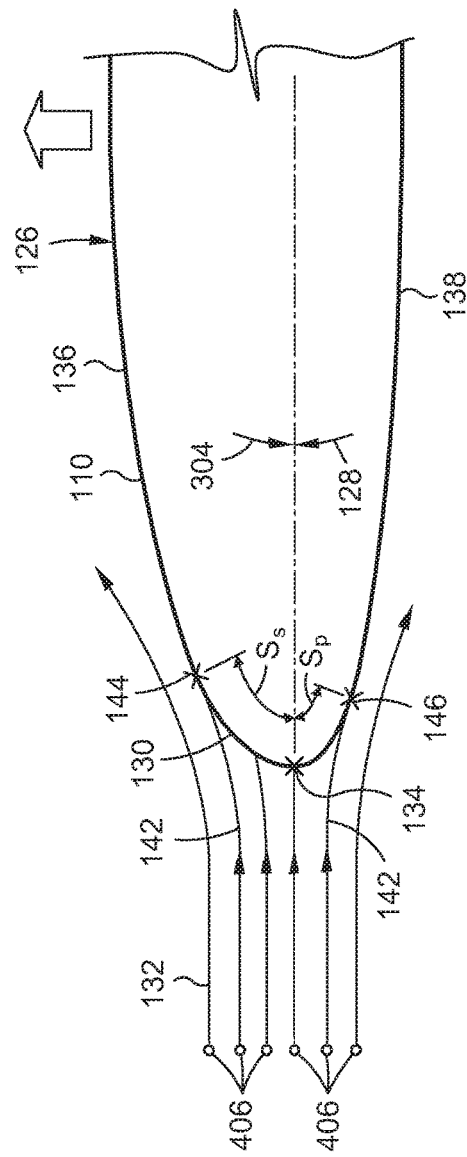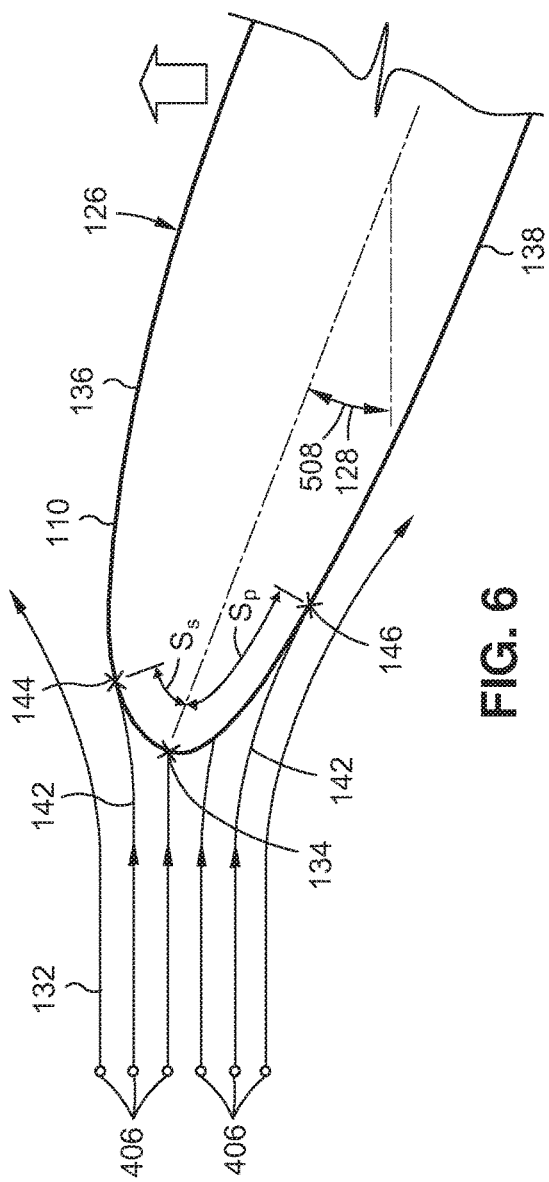

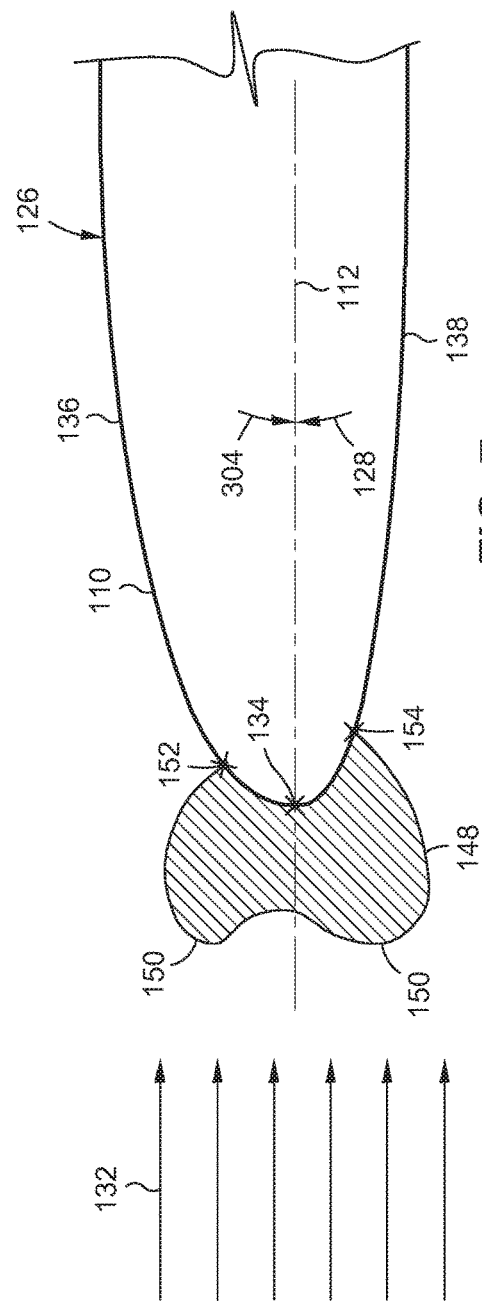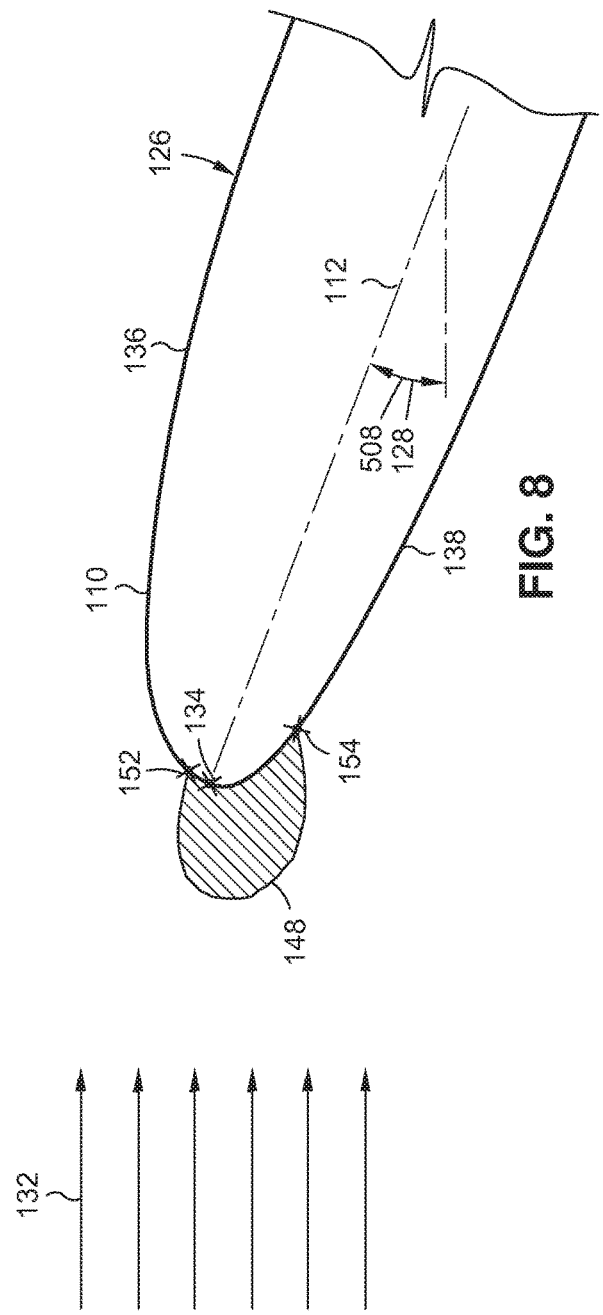

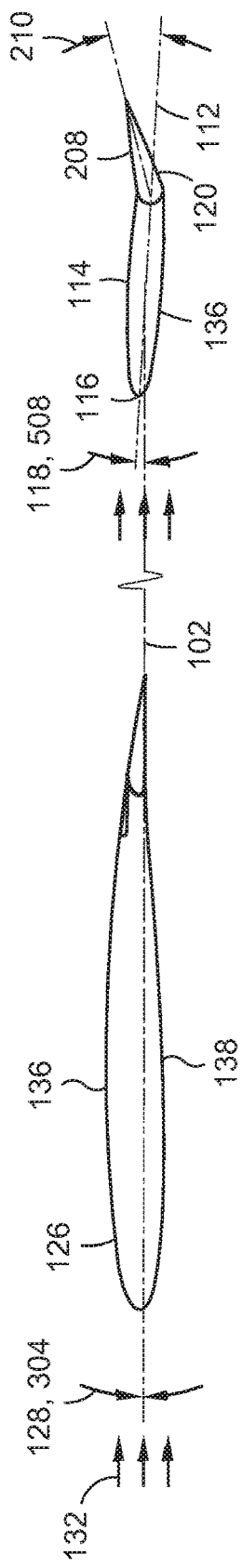
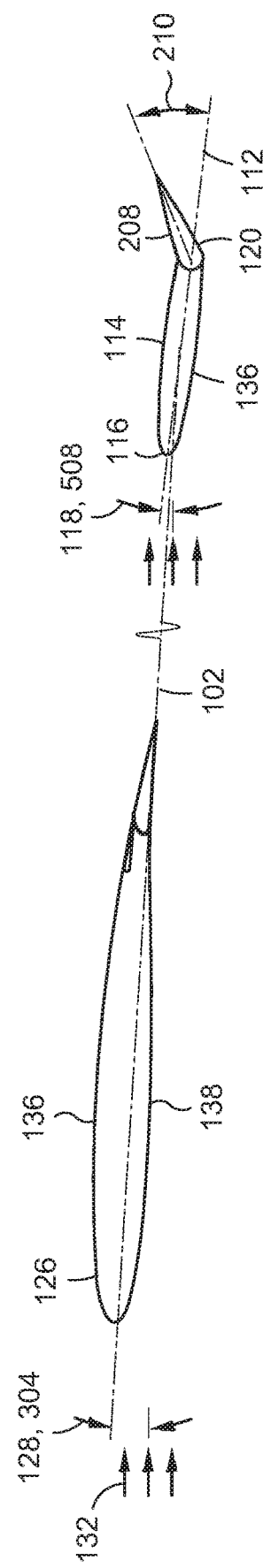

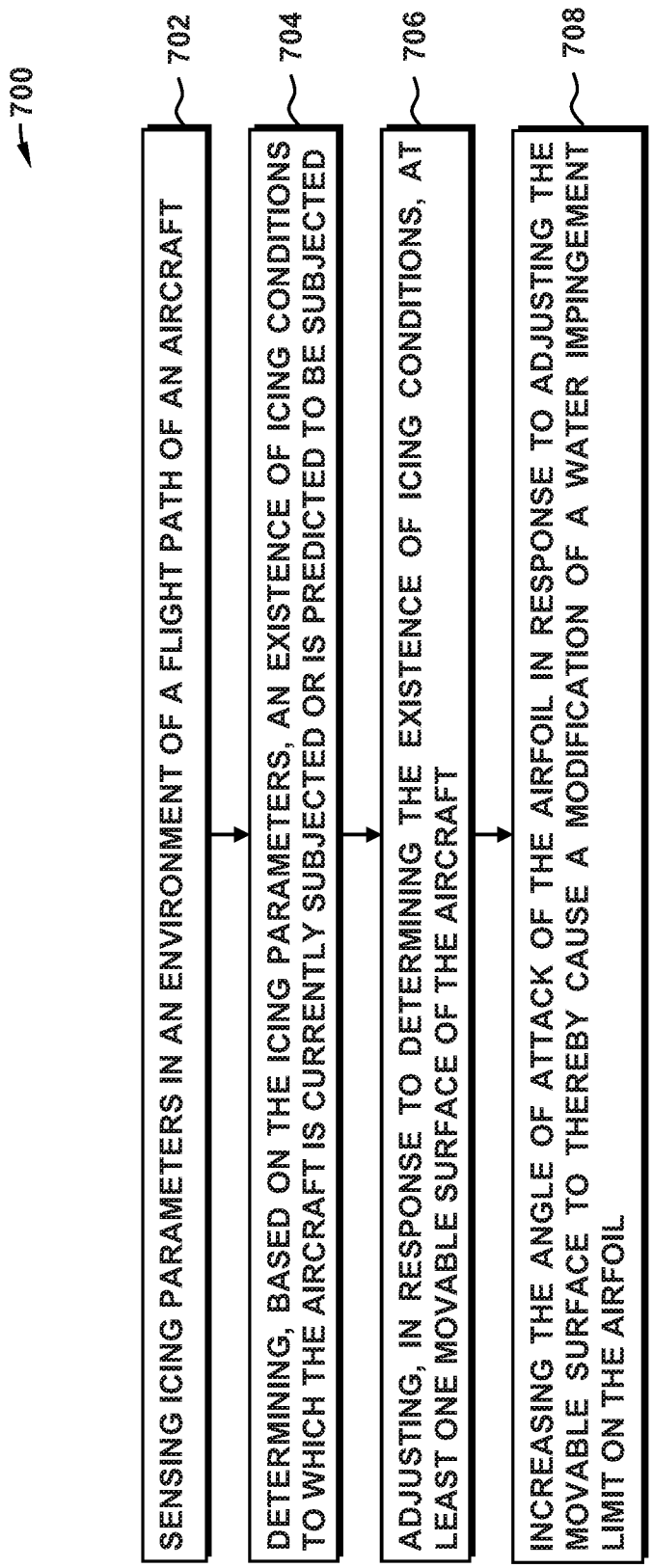

SYSTEM AND METHOD FOR MODIFYING THE LOCATION OF WATER IMPINGEMENT LIMITS ON AN AIRFOIL

FIELD

The present disclosure relates generally to aircraft flight operations and, more particularly, to a system and method for modifying the water impingement limits on an airfoil of an aircraft.

BACKGROUND

Ice can form on the surfaces of an aircraft in flight when water droplets impinge and freeze on the aircraft surfaces. The accretion of ice on certain aerodynamic surfaces can reduce the performance and handling characteristics of the aircraft. For example, ice accretion on the leading edges of the wings can alter the cross-sectional shape of the wings which can disrupt the flow of air over the wings, resulting in reduced lift capability of the wings, increased aerodynamic drag, added weight, and increased stall speed of the aircraft.

Current methods of addressing ice accretion on the leading edges of airfoils include the use of inflatable deicing boots mounted on leading edge surfaces. When ice has accumulated on a leading edge, the boots may be inflated with compressed air causing the ice to crack. Air flowing over the wings blows the ice off the wings, after which the boots are deflated to return the leading edge to its pre-inflated shape. Although generally effective, deicing boots add cost, complexity and weight to the aircraft.

Another method of addressing ice accretion on leading edges involves the use of a bleed air de-icing or anti-icing system in which hot air is bled from gas turbine engines of an aircraft. The bleed air is routed through spray tubes extending along the interior of the leading edges and is discharged in a manner to heat the wing surfaces. The bleed air may be periodically activated in a manner to maintain the surfaces of the leading edges above freezing to prevent the formation of ice, or to melt the ice to an extent that air flowing over the wings blows the ice off the wings. Although effective in addressing ice accretion, the extraction of bleed air from the engines reduces engine performance. In addition, the spray tubes and other hardware of a bleed air system add to the cost, complexity and weight of the aircraft.

As can be seen, there exists a need in the art for a system and method for reducing ice accretion on an airfoil that reduces the need for ice protection hardware (e.g., deicing or anti-icing system hardware).

SUMMARY

The above-noted needs associated with ice accretion on airfoils are specifically addressed and alleviated by the present disclosure which provides a system for modifying a location of a water impingement limit on an airfoil of an aircraft. The system includes a flight control computer configured to receive data representative of environmental parameters in an environment of a flight path of an aircraft. In addition, the flight control computer is configured to determine, based on the environmental parameters, an existence of icing conditions to which the aircraft is currently subjected or is predicted to be subjected. Furthermore, the flight control computer is configured to generate, based on the existence of icing conditions, a command signal for actuating a movable surface of the aircraft. The system further includes a surface actuator configured to receive the command signal from the flight control computer and adjust the movable surface in a manner causing an increase in an angle of attack of the airfoil to thereby modify a water impingement limit on the airfoil.

Also disclosed is a method of modifying a location of a water impingement limit on a surface of an airfoil of an aircraft. The method includes sensing environmental parameters in an environment of a flight path of an aircraft, and determining, based on the environmental parameters, an existence of icing conditions to which the aircraft is currently subjected or is predicted to be subjected. In addition, the method includes adjusting, in response to determining the existence of icing conditions, at least one movable surface of the aircraft, and increasing an angle of attack of the airfoil in response to adjusting the movable surface to thereby cause a modification of a water impingement limit on the airfoil.

A further example of the method includes sensing an air temperature and a droplet size of water droplets in an environment of a flight path of the aircraft, determining, based on the air temperature and the droplet size, an existence of icing conditions to which the aircraft is currently subjected or is predicted to be subjected, and upwardly deflecting, in response to determining the existence of icing conditions, at least one laterally symmetric pair of movable surfaces respectively coupled to the pair of wings. In addition, the method includes increasing a wing angle of attack of the wings in response to upwardly deflecting the laterally symmetric pair of movable surfaces to thereby cause a forward and downward shift of a water impingement upper limit on an upper surface of the wings and an aftward and downward shift of a water impingement lower limit on a lower surface of the wings.

The features, functions and advantages that have been discussed can be achieved independently in various examples of the present disclosure or may be combined in yet other examples, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 4 is a section view taken along line 4 of FIG. 3 and illustrating a wing and a horizontal stabilizer oriented respectively at a wing angle of attack and a stabilizer angle of attack;

FIG. 5 is a side view of a forward portion of a wing oriented at an angle of attack of 0° and illustrating the location of a suction side water impingement limit on the suction side (e.g., upper side) of the wing and a pressure side water impingement limit on the pressure side (e.g., lower side) of the wing as defined by the tangent trajectories of water droplets entrained in a freestream flow through which the airfoil is moving;

FIG. 6 is a side view of the forward portion of the wing of FIG. 5 oriented at an increased angle of attack and resulting in a combination lowering and forward shifting of the suction side water impingement limit and a combination lowering and aftward shifting of the pressure side water impingement limit relative to the corresponding water impingement limits of FIG. 5;

FIG. 7 is a side view of a forward portion of a wing oriented at an angle of attack of 0° and illustrating ice accretion on the wing leading edge;

FIG. 8 is a side view of a forward portion of the wing of FIG. 7 oriented at an increased angle of attack and resulting in a downward shifting of the location of ice accretion on the wing leading edge relative to the ice accretion in FIG. 7;

FIG. 16 is a section view of the wing and horizontal stabilizer and elevator of FIG. 10 showing the upward deflection of the horizontal stabilizer and the upward deflection of the elevator resulting in the stabilizer angle of attack being oriented in an upward direction in a manner maintaining nose-down authority of the elevator in icing conditions;

FIG. 17 is a section view of the wing and horizontal stabilizer and elevator of FIG. 16 showing increased upward deflection of the elevator causing an upward increase in the wing angle of attack along with the upward deflection of the horizontal stabilizer in a manner maintaining nose-down authority of the elevator;

FIG. 19 is a flow chart of operations included in a method of modifying the location of the water impingement limits on an airfoil.

DETAILED DESCRIPTION

Figure 1:
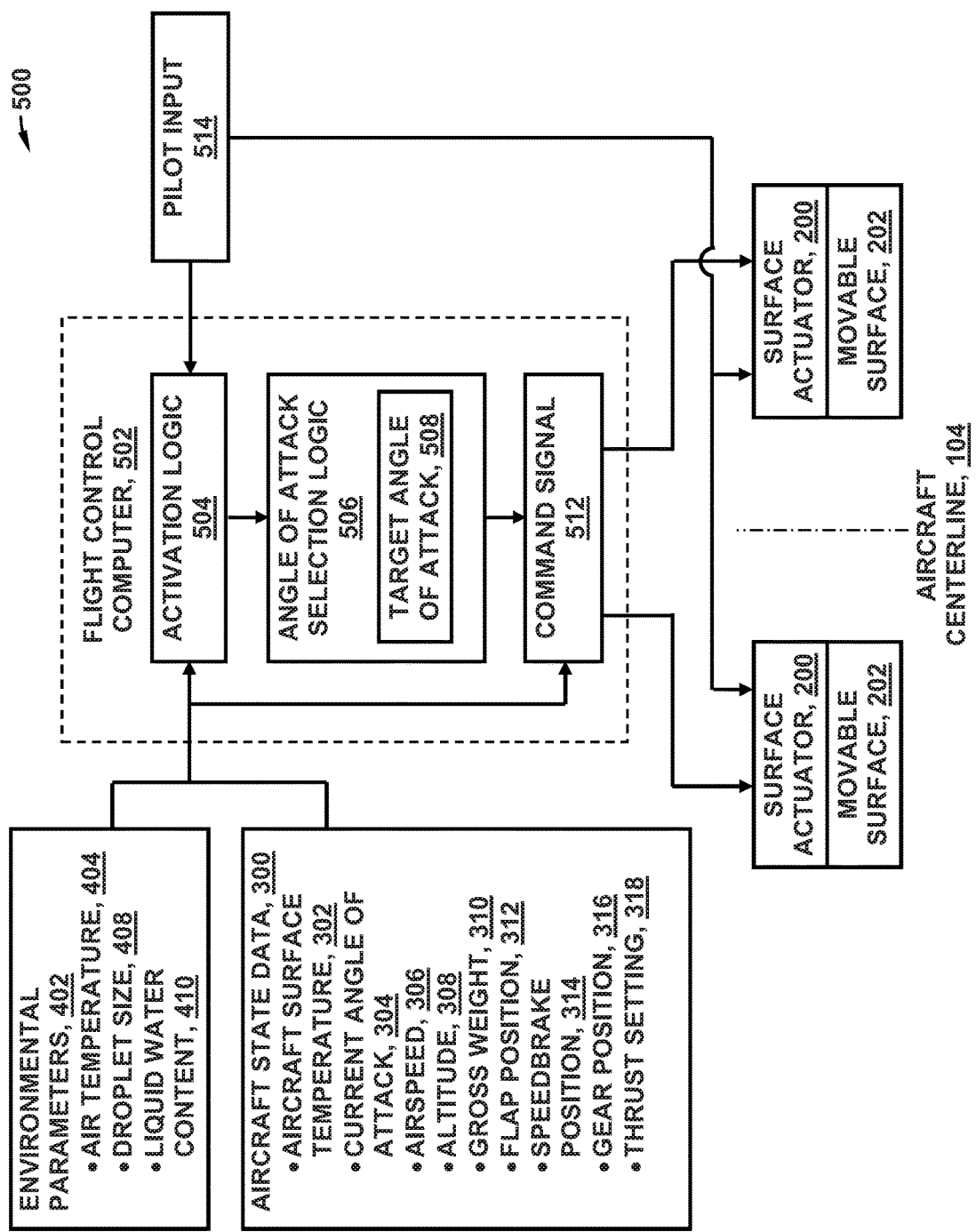
FIG. 1 is a schematic diagram of a system for modifying the water impingement limits on an airfoil.
Figure 2:
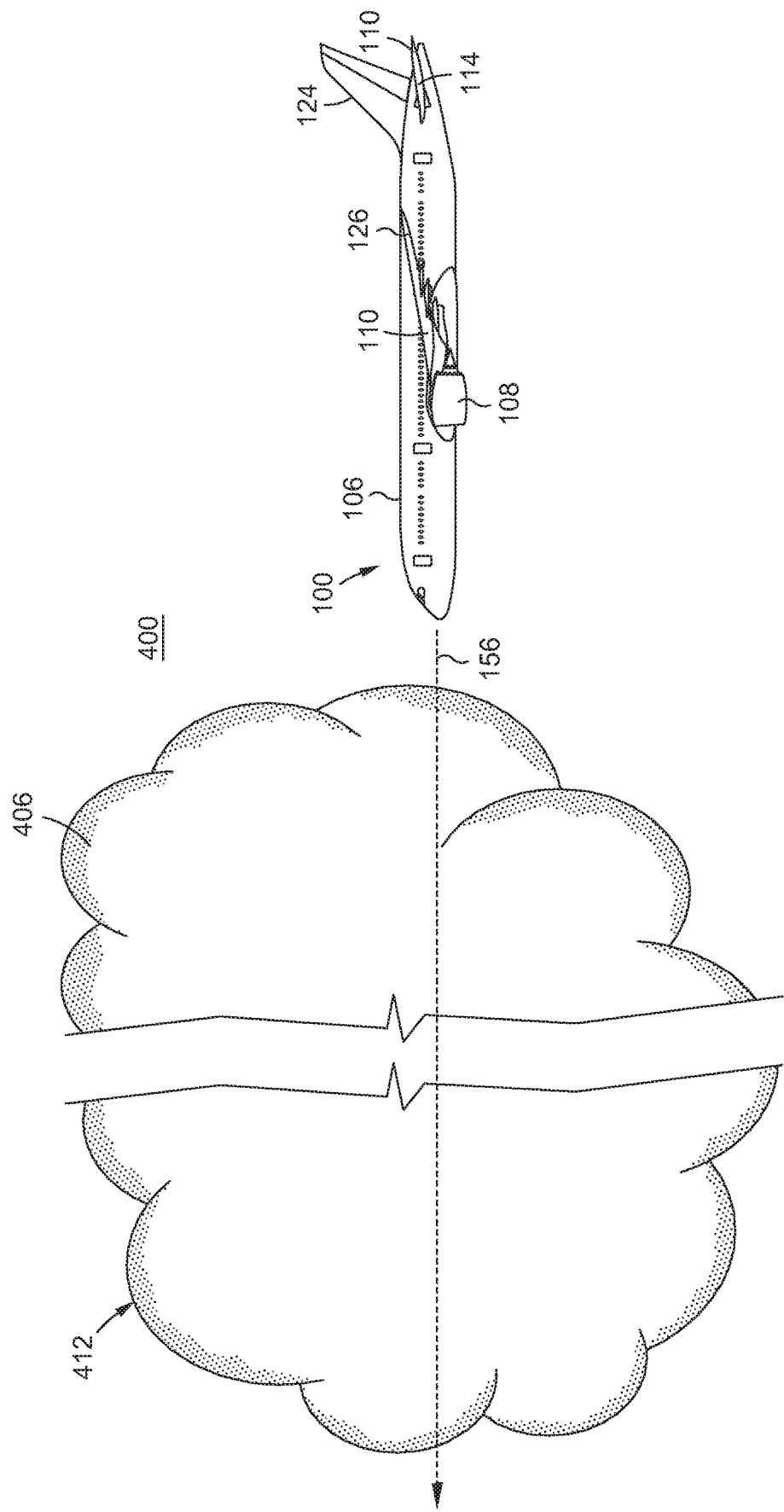
FIG. 2 is an illustration of an aircraft on a flight path toward a cloud containing icing conditions.

Referring now to the drawings wherein the showings are for purposes of illustrating preferred and various examples of the disclosure, shown in FIG. 1 is a schematic diagram of a water impingement limit modification system 500 for modifying the location of the water impingement limits 144, 146 (FIGS. 5-6) on at least one airfoil 110 (FIG. 2) of an aircraft 100 (FIG. 2). Modification of the location of the water impingement limits 144, 146 on an airfoil 110 results in the modification of the location of ice accretion limits 152, 154 (FIGS. 7-8) on the airfoil 110. Modifying the location of the ice accretion limits 152, 154 reduces the negative effects of ice accretion 148 on the aerodynamics of air flowing over the airfoil 110. For example, modifying the location of the ice accretion limits 152, 154 reduces the extent of flow separation (not shown) over the airfoil 110 that may occur as a result of the ice accretion 148. In addition, modifying the location of the ice accretion limits 152, 154 reduces the negative effect of ice accretion 148 on the maximum lift coefficient 610 (e.g., FIG. 9), and reduces the amount of aerodynamic drag generated by the ice accretion 148.

As described in greater detail below, the water impingement limits 144, 146 on an airfoil 110 are the locations defined by the tangent trajectories 142 (FIGS. 5-6) of water droplets 406 (FIGS. 4-6), in the flow of air moving over the airfoil 110. For example, referring to FIG. 5, shown is a forward portion or wing leading edge 130 of a wing 126 which has a suction side 136 (i.e., a wing upper surface having a relatively high degree of curvature, the side of lower pressure side), and a pressure side 138 (i.e., a wing 126 lower surface having a relatively low degree of curvature, the side of higher pressure). The suction side 136 has a suction side water impingement limit 144 and the pressure side 138 has a pressure side water impingement limit 146 which are each measured along the airfoil 110 surface relative to the highlight 134 of the airfoil 110. In the present disclosure, the highlight 134 of an airfoil 110 is the point furthest forward on the surface of the leading edge when the airfoil 110 is at an angle of attack of 0°. For airfoils 110 having a symmetrical cross-section such as some horizontal tails (e.g., a horizontal stabilizer 114 and elevator 120—FIGS. 3-4), the suction side 136 and the pressure side 138 may have the same degree of curvature. However, orienting the horizontal tail at an angle of attack in which the stabilizer leading edge 116 is oriented in a downward direction generates low pressure or suction on the stabilizer lower side such that the stabilizer lower side is the suction side 136 (i.e., the side of lower pressure side) and the stabilizer upper side is the pressure side 138 (i.e., the side of higher pressure side). Regardless of whether the suction side 136 of an airfoil 110 is on the upper side or the lower side of the airfoil 110, the suction side water impingement limit 144 and the pressure side water impingement limit 146 of an airfoil 110 are each located at a respective tangent trajectory 142 (FIGS. 5-6) of a water droplet 406 (FIGS. 4-6) of a given size that starts out upstream of the airfoil 110 in the freestream flow 132 (e.g., FIGS. 4-7), as described in greater detail below.

When an aircraft 100 (FIG. 2) is subjected to icing conditions, water droplets 406 (FIGS. 2 and 4-6) impinging on the airfoil 110 (e.g., between the suction side water impingement limit 144 and the pressure side water impingement limit 146—FIGS. 5-6) will freeze, causing ice accretion 148 (FIG. 7) on the airfoil 110. Advantageously, in the presently-disclosed system 500 (FIG. 1), the system 500 is configured to detect the existence of icing conditions such that when the aircraft 100 encounters or is predicted to encounter icing conditions, the system 500 is configured to increase the angle of attack (FIG. 6) of at least one airfoil 110 of the aircraft 100 in a manner causing the location of the water impingement limits 144, 146 (FIGS. 5-6) to proactively shift at least partially away from the suction side 136 (FIGS. 5-6), and shift more toward the pressure side 138 (FIGS. 5-6). In the example of the wing 126 of FIGS. 5-6, an increase in the wing angle of attack 128 causes a combination lowering and forward shifting of the suction side water impingement limit 144 relative to the highlight 134, and a combination lowering and aftward shifting of the pressure side water impingement limit 146 relative to the highlight 134. Correspondingly in FIGS. 7-8, the shifting of the water impingement limits 144, 146 (FIGS. 5-6) has the effect of shifting the location of the ice accretion limits 152, 154 (FIGS. 7-8) at least partially away from the suction side 136 (i.e., area of high curvature) of the wing 126, which reduces the above-mentioned negative effects of ice accretion 148 on the aerodynamics of the wing 126.

Referring again to FIG. 1, the system 500 includes a flight control computer 502 configured to receive data representative of environmental parameters 402 sensed in an environment 400 (FIG. 2) of a flight path 156 (FIG. 2) of an aircraft 100 (FIG. 2). The flight control computer 502 may include activation logic 504 configured to determine the existence of icing conditions based on the environmental parameters 402 and additionally, but optionally, based on aircraft state data 300. In this regard, the flight control computer 502 determines the existence of icing conditions to which the aircraft 100 is currently subjected, or the existence of icing conditions to which the aircraft 100 is predicted to be subjected at some point along the flight path 156 of the aircraft 100. Upon determining the existence of icing conditions, the flight control computer 502 may include angle of attack selection logic 506 for determining the amount by which the angle of attack of the airfoil 110 (FIG. 2) is to be increased. The flight control computer 502 is configured to generate one or more command signals 512 at the appropriate time for actuating one or more movable surfaces 202 (e.g., spoilers 218, ailerons 214, horizontal stabilizer 114, elevator 120, etc.—FIGS. 3 and 10-15) of the aircraft 100. For example, upon determining the current existence of icing conditions, the flight control computer 502 may immediately (e.g., within several seconds of detecting icing conditions) generate one or more command signals 512. In contrast, upon determining the existence of icing conditions predicted to occur a later point along the flight path 156, the flight control computer 502 may be configured to wait until the aircraft 100 nears the predicted location of the icing conditions, and then generate command signals 512 preferably prior (e.g., within several seconds) to the time when the aircraft 100 enters the icing conditions.

In FIG. 1, the system 500 further includes one or more surface actuators 200 configured to receive command signals 512 from the flight control computer 502 and, in response to the command signals 512, adjust one or more of the movable surfaces 202 in a manner causing an increase in the angle of attack of the airfoil 110 (FIGS. 5-6) to thereby modify the water impingement limits 144, 146 (FIGS. 5-6) on the airfoil 110. For example, in an example described in greater detail below, the flight control computer 502 may detect the existence of icing conditions, and may generate a command signal 512 causing existing spoiler actuators (not shown) to upwardly deflect the spoilers 218 (FIG. 11) and/or existing aileron actuators (not shown) to upwardly deflect the ailerons 214 (FIG. 12) in a manner causing the wing angle of attack 128 (FIGS. 10-12) to increase by a relatively small amount (e.g., 0.5 to) 4°, and resulting in a proactive shifting of the location of the water impingement limits 144, 146 (FIGS. 5-6) at least partially away from the suction side 136 (e.g., FIGS. 5-6) of the wing 126 and at least partially toward the pressure side 138 (e.g., FIGS. 5-6), to thereby reduce the effects of ice accretion 148 (FIGS. 7-8) on the aerodynamics of the air flowing over the wing 126.

Referring to FIG. 2, shown is an aircraft 100 on a flight path 156 passing through a cloud 412 containing icing conditions. The aircraft 100 has one or more airfoils 110 (e.g., wings 126, horizontal stabilizer 114—FIGS. 2-3) that may be subjected to ice accretion 148 (FIGS. 7-8) when the aircraft 100 is in the icing conditions. The aircraft 100 additionally includes a plurality of movable surfaces 202 (e.g., spoilers 218, ailerons 214, etc.—FIG. 3) for attitude and directional control of the aircraft 100. In the present system 500 and method 700 (FIG. 19), one or more of the movable surfaces 202 are temporarily actuated in a manner that increases the angle of attack of one or more of the airfoils 110 as a means for proactively shifting the location of the water impingement limits 144, 146 (FIGS. 5-6) on the one or more airfoils 110 to thereby reduce the effects of ice accretion 148 (FIG. 7-8 on the one or more airfoils 110. Although the present disclosure describes icing conditions as occurring within a cloud 412, icing conditions may occur in non-cloud conditions. In this regard, icing conditions may occur at any time when water droplets 406 (e.g., liquid water—FIGS. 2 and 4-6) freeze upon impingement on an aircraft 100 surface, or freeze shortly after (e.g., within several seconds) impingement on an aircraft 100 surface.

Referring still to FIG. 1, as mentioned above, the flight control computer 502 receives data representative of environmental parameters 402, and determines the existence of icing conditions presently occurring and/or predicted to occur along the aircraft 100 flight path 156 (FIG. 2). Such environmental parameters 402 include, but are not limited to, air temperatures 404 along the flight path 156 (FIG. 2), droplet size 408 of water droplets 406 (FIG. 2) in the atmosphere (e.g., in clouds 412—FIG. 2) along the flight path 156, and liquid water content 410 of clouds 412 along the flight path 156. Such environmental parameters 402 may be sensed by ground-based sensors and forward/or airborne sensors (e.g., onboard the aircraft 100) prior to and/or during the flight of the aircraft 100. The environmental parameters 402 may be periodically or continuously provided to the flight control computer 502. For example, ground-based or airborne weather forecasting instrumentation may predict the occurrence of weather conducive to ice accretion 148 during the flight of the aircraft 100, and may provide such environmental parameter data to the flight control computer 502 prior to and/or during the flight of the aircraft 100. Information regarding the existence, location and/or severity of icing conditions encountered and reported by pilots of other aircraft 100 near the flight path 156 may also be manually or automatically entered into the flight control computer 502.

Referring to FIG. 1, in the present disclosure, air temperature 404 is the temperature of ambient air along the flight path 156 (FIG. 2) and may be periodically or continuously measured and provided to the flight control computer 502 by ground-based or airborne temperature measurement instrumentation. Droplet size 408 may also be periodically or continuously measured and provided to the flight control computer 502 to facilitate a determination of the existence of icing conditions. For example, upon receiving data indicating an air temperature 404 of 0° C. or colder, and data indicating the presence of water droplets 406 (FIG. 2), the flight control computer 502 may determine that icing conditions exist. For environmental conditions in which the air temperature 404 is slightly warmer than 0° C., the flight control computer 502 may determine that icing conditions exist based on aircraft state data 300 including aircraft surface temperature 302 measurements lower than 0° C., and which may occur if the aircraft 100 has been exposed to air temperatures 404 below 0° C., and is later located in temperatures at or above 0° C. while the aircraft surface temperature 302 is still below freezing. Measurement of aircraft surface temperature 302 may be periodically or continuously provided to the flight control computer 502 by temperature sensors (not shown) for monitoring the temperature of the airfoil 110 surface. Such temperature sensors may be mounted on the wing leading edge 130 (FIG. 4) of the wing 126 (FIG. 4), stabilizer leading edge 116 (FIG. 4) of the horizontal stabilizer 114 (FIG. 4), and/or at other locations on the airframe.

At air temperatures 404 (FIG. 1) between 0° C. and approximately −15° C., clouds 412 (FIG. 2) may be comprised of supercooled water droplets which exist in liquid form at temperatures below 0° C. Droplet size 408 (FIG. 1) represents the size of water droplets 406 such as within a cloud 412, and may be expressed in terms of median volume diameter (MVD). Given a droplet size 408 distribution within a cloud 412, the MVD represents the droplet diameter (e.g., microns) for which half the total liquid water content 410 in the cloud 412 is contained in water droplets 406 that are larger than the median, and half the total liquid water content 410 is contained in water droplets 406 that are smaller than the median. Droplet size 408 may be measured and provided to the flight control computer 502 (FIG. 1) by airborne light detection and ranging (LIDAR) instrumentation (not shown) or other optical instrumentation such as an optical spectrometer.

Liquid water content 410 may be described as the amount of water contained within a given volume of cloud 412 (FIG. 2). Liquid water content 410 may be expressed in terms of total mass (e.g., grams) of water per unit volume (e.g., cubic meter) of cloud 412. Liquid water content 410 may be indicated and provided to the flight control computer 502 by instrumentation such as a Rosemont Ice Detector (not shown) or by a heated-resistance wire (not shown) mounted outside of the aircraft 100 (FIG. 2) which measures the reduction in temperature as water droplets 406 (FIG. 2) hit the wire and evaporate. The reduction in wire temperature from water droplet evaporation may be correlated to the liquid water content 410 of a cloud 412.

Air temperature 404 (FIG. 1), droplet size 408 (FIG. 1), liquid water content 410 (FIG. 1) and other variables (e.g., altitude 308, horizontal and vertical extent of clouds 412, etc.) are used by aviation governing bodies such as the Federal Aviation Administration (FAA) and foreign equivalents for determining design envelopes for the design of aircraft 100 (FIG. 1) to meet certification requirements for operation in icing conditions. For example, Federal Aviation Regulation (FAR) Part 25, Appendix C, defines an icing envelope (identified as a continuous maximum atmospheric icing condition) in which the mean effective drop diameter (e.g., median volume diameter, MVD) is 15-40 microns. FAR Part 25, Appendix 0, defines an icing envelope of supercooled large drop (SLD) icing conditions in which the drop median volume diameter (MVD) is less than or greater than 40 microns, the maximum mean effective drop diameter (MED) of Appendix C continuous maximum (stratiform clouds) icing conditions. Such SLD icing conditions include freezing drizzle (e.g., conditions with spectra maximum drop diameters of from 100-500 microns) and freezing rain (e.g., conditions with spectra maximum drop diameters greater than 500 microns) occurring in and/or below stratiform clouds. In this regard, the icing conditions of Appendix 0 include droplet sizes 408 that are larger than the droplet sizes 408 included in the icing conditions of Appendix C. Due to their greater mass, the droplet sizes 408 under Appendix 0 will impinge further aft on an airfoil 110 (FIGS. 5-6) than the relatively smaller droplet sizes 408 under Appendix C, such that the icing conditions of Appendix 0 result in the suction side water impingement limit 144 (FIGS. 5-6) extending further aft on the suction side 136 (FIGS. 5-6), causing a correspondingly greater disruption of airflow over the airfoil 110 relative to the airflow disruption caused by icing conditions of Appendix C.

In general, the air temperature 404 (FIG. 1) and/or the droplet size 408 (FIG. 1), influence the severity of the icing condition. Additionally, the higher the liquid water content 410 (FIG. 1), the more severe the icing condition. Similarly, the longer the duration over which the aircraft 100 (FIG. 2) is exposed to relatively large water droplets 406 (FIG. 2), the more severe the icing conditions. The horizontal extent (e.g., the horizontal distance) of clouds 412 (FIG. 2) containing icing conditions and the airspeed 306 (FIG. 1) of the aircraft 100 may be used by the flight control computer 502 (FIG. 1) to determine the duration and therefore the severity of the icing conditions. The combination of airspeed 306 and liquid water content 410 may also be used by the flight control computer 502 to determine the severity of icing conditions, due to the fact that a higher airspeed 306 corresponds to a larger quantity of water droplets 406 impinging on the aircraft 100 per unit time. As described above, due to its relatively large droplet sizes 408, FAR Part 25 Appendix 0 represents a higher level of severity of icing conditions than the icing conditions of FAR Part 25 Appendix C which includes relatively smaller droplet sizes 408.

In any one of the system 500 (FIG. 1) examples disclosed herein, the flight control computer 502 (FIG. 1) may determine a severity of icing conditions based on at least one of air temperature 404 (FIG. 1) and droplet size 408 (FIG. 1) of water droplets 406 (FIG. 2) in the environment 400 (FIG. 2) of a flight path 156 (FIG. 2). The flight control computer 502 may generate a command signal 512 (FIG. 1) proportional to increasing severity of the icing conditions such that one or more surface actuators 200 (FIG. 1), upon receiving the command signal 512, adjusts one or more movable surfaces 202 by an amount proportional to the severity of the icing conditions. In addition to or as an alternative to determining icing condition severity based on air temperature 404 and/or droplet size 408, the flight control computer 502 may determine icing condition severity based on the above-mentioned liquid water content 410 of clouds, airspeed 306 (FIG. 1), duration of exposure, and other factors such as cloud type (e.g., vertically-developed cumulus-type clouds versus horizontally developed stratus-type clouds). The flight control computer 502 may determine the target angle of attack 508 (FIG. 6) of an airfoil 110 (FIG. 6) based on the severity of the icing conditions. In this regard, the flight control computer 502 may calculate a higher target angle of attack 508 (e.g., in an upward direction for a wing—FIG. 6; in a downward direction for a horizontal stabilizer—FIGS. 13-15) for icing conditions that are more severe, and may calculate a lower target angle of attack 508 for icing conditions that are less severe. For example, the flight control computer 502 may calculate a relatively high (or higher) target angle of attack 508 (e.g., in the range of approximately 2-4° higher than the current angle of attack) for icing conditions defined in FAR Part 25 Appendix 0 or foreign equivalents, and a relatively low (or lower) target angle of attack 508 (e.g., in the range of approximately 0.5-2° higher than the current angle of attack) for icing conditions defined in FAR Part 25 Appendix C or foreign equivalents.

However, in other examples, the flight control computer 502 may generate a command signal 512 for actuating one or more movable surfaces 202 in a manner to increase the angle of attack of an airfoil 110 to an absolute value (e.g., the target angle of attack) regardless of the current angle of attack of the airfoil 1 110. For example, upon determining the existence of icing conditions, the flight control computer 502 may generate a command signal 512 for achieving an absolute value of approximately 4° for the wing angle of attack 128, regardless of the current angle of attack of the wings 126. In another example, the flight control computer 502 may generate a command signal 512 for achieving an absolute value for the target angle of attack regardless of the current angle of attack, but which is based on the severity of icing conditions. For example, the flight control computer 502 may calculate an absolute value for a target angle of attack 508 of approximately 5° for icing conditions defined in FAR Part 25 Appendix 0 or foreign equivalents, and may calculate an absolute value for a target angle of attack 508 of approximately 3° for icing conditions defined in FAR Part 25 Appendix C or foreign equivalents.

Figure 3:
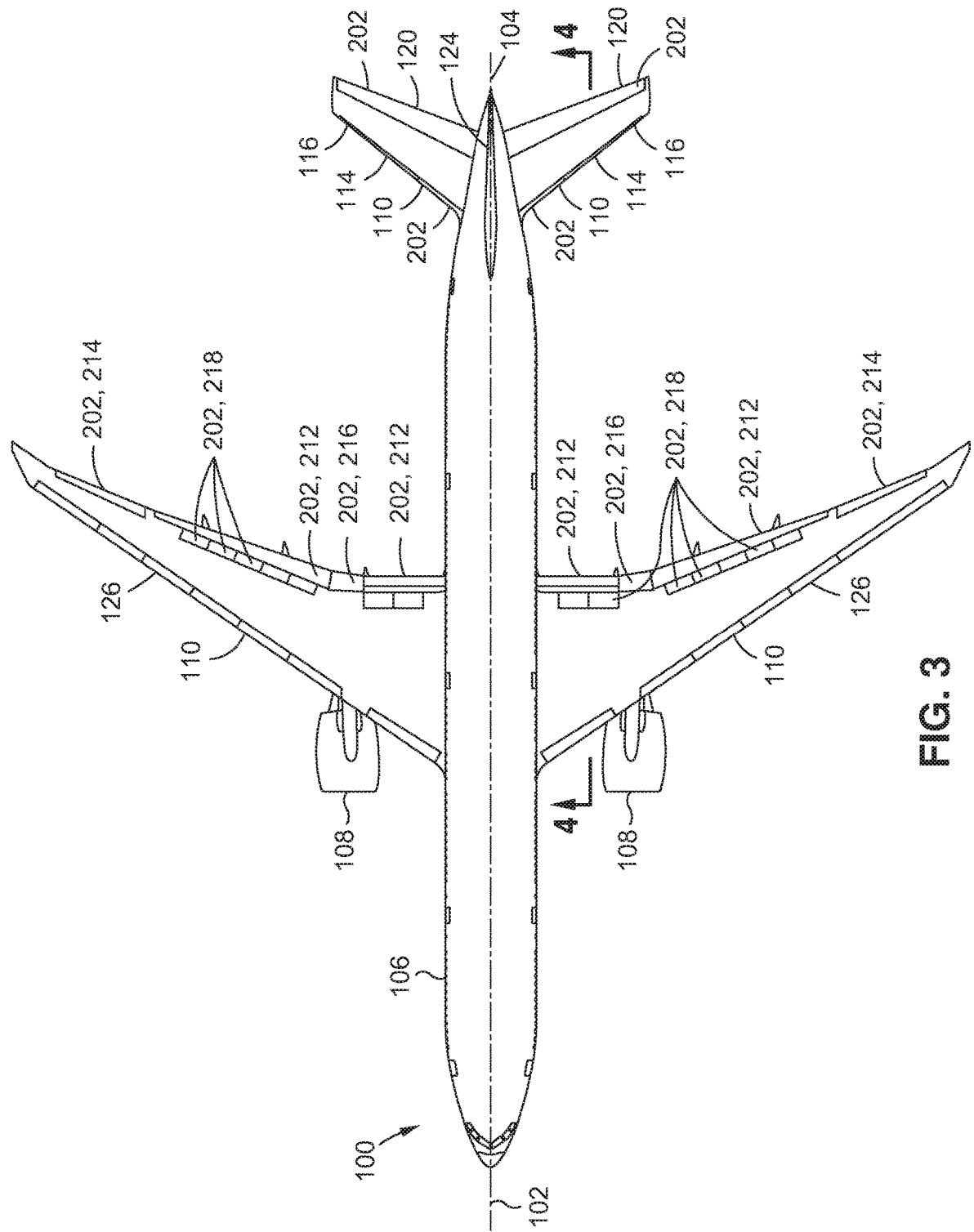
FIG. 3 is a top view of an aircraft having movable surfaces that are adjustable using the presently-disclosed system for increasing the angle of attack of one or more airfoils of the aircraft to thereby cause a modification of the water impingement limit of the airfoils.

In FIGS. 2-3, the aircraft 100 is a tube-and-wing configuration having a fuselage 106 and a longitudinal axis 102 extending between the forward end and the aft end of the fuselage 106. The aircraft 100 may include one or more propulsion units 108 and one or more airfoils 110. For example, the aft end of the fuselage 106 may include a vertical tail 124 and a horizontal tail. The horizontal tail may include a pair of horizontal stabilizers 114 (FIG. 3) symmetrically located on laterally opposite sides of an aircraft centerline 104 (FIG. 3) which may be coincident with the longitudinal axis 102. An elevator 120 may be pivotably coupled to each one of the horizontal stabilizers 114.

Referring to FIG. 3, the aircraft 100 may include a pair of wings 126, each of which may have a plurality of movable surfaces 202 symmetrically located on laterally opposite sides of the aircraft centerline 104. For example, the wings 126 may each include movable surfaces 202 such as spoilers 218 laterally symmetrically located on opposite sides of the aircraft centerline 104. Each wing 126 may also include movable surfaces 202 such as flaps 212, ailerons 214, and/or flaperons 216 which may also be laterally symmetrically located on opposite sides of the aircraft centerline 104. As described in greater detail below, the system 500 (FIG. 1) and method 700 (FIG. 19) is configured such that at least one laterally symmetric pair of movable surfaces 202 is deflected upon the generation of a command signal 512 (FIG. 1) from the flight control computer 502 (FIG. 1) in response to the flight control computer 502 determining the existence of icing conditions.

Although the presently-disclosed system 500 (FIG. 1) and method 700 (FIG. 19) is described in the context of a tube-and-wing airplane as shown in FIGS. 2-3, the system 500 and method 700 may be implemented in other airplane configurations including, but not limited to, a blended wing body configuration (not shown), a flying wing configuration (not shown), and any other one of a variety of aircraft configurations. In this regard, the movable surfaces 202 (FIG. 1) for non-tube-and-wing airplane configurations may include elevons, canards, and/or other types of movable surfaces 202 laterally symmetrically located on opposite sides of the aircraft centerline 104, and capable of increasing the angle of attack of an airfoil 110 (FIG. 2) in response to a command signal 512 from a flight control computer 502 to temporarily increase the angle of attack of the airfoil 110 for purposes of shifting the water impingement limits 144, 146 (FIGS. 5-6) of the airfoil 110.

FIG. 4 is a section view of wing 126 and a horizontal stabilizer 114 and elevator 120 of the aircraft 100 of FIG. 3. The wing 126 may include the above-mentioned movable surfaces 202 including flaps 212, ailerons 214, flaperons 216, and/or spoilers 218, each of which has a surface trailing edge 204. The horizontal stabilizer 114 and the elevator 120 may also be referred to as movable surfaces 202. The horizontal stabilizer 114 has a stabilizer leading edge 116, and the elevator 120 has an elevator trailing edge 122.

The wing 126 is oriented at a wing angle of attack 128 and the horizontal stabilizer 114 is oriented at a stabilizer angle of attack 118. In present disclosure, the angle of attack of an airfoil 110 is the angle between the chord line 112 of the airfoil 110 and the direction of the freestream flow 132 located immediately upstream of the airfoil 110. In the present disclosure, the chord line 112 of an airfoil 110 extends between the leading edge (e.g., wing leading edge 130) and the trailing edge (e.g., surface trailing edge 204) of the airfoil 110 when high-lift devices (e.g., flaps 212, leading edge slats—not shown) are retracted. The chord line 112 for the horizontal stabilizer 114 extends between the stabilizer leading edge 116 and the elevator trailing edge 122 when the elevator 120 is non-deflected.

As mentioned above, an airfoil 110 has a suction side 136 and a pressure side 138. The suction side 136 faces in the same direction as the direction of lift 140 generated by the airfoil 110, and the pressure side 138 faces in a direction opposite the direction of lift 140. For the case where the airfoil 110 is a wing 126, the lift 140 is directed upwardly. In FIG. 4, for the case where the airfoil 110 is a horizontal tail, the lift 140 may be directed downwardly to counteract a nose-down pitching moment caused by the upwardly directed lift 140 of the wings 126 acting aft of a center of gravity (not shown) of the aircraft 100.

In the present disclosure, an increase in the angle of attack of an airfoil 110 causes the suction side 136 of the airfoil 110 to be angled more aftwardly or away from the direction of the oncoming freestream flow 132, and the pressure side 138 of the airfoil 110 to be angled more forwardly or toward the direction of the oncoming freestream flow 132. In FIG. 4, an increase in the wing angle of attack 128 results in the wing leading edge 130 being increasingly oriented in an upward direction. An increase in the stabilizer angle of attack 118 results in the stabilizer leading edge 116 being increasingly oriented in a downward direction.

Referring to FIGS. 5-6, shown in FIG. 5 is a forward portion of a wing 126 oriented at a wing angle of attack 128 of 0° C. As described above, the suction side 136 has a suction side water impingement limit 144 and the pressure side 138 has a pressure side water impingement limit 146 which are each defined by the tangent trajectories 142 of water droplets 406 in the freestream flow 132. The suction side water impingement limit 144 and the pressure side water impingement limit 146 are each measured along the airfoil 110 surface relative to the highlight 134. For example, the surface distance Ss is the distance between the highlight 134 and the suction side water impingement limit 144. The surface distance Sp is the distance between the highlight 134 and the pressure side water impingement limit 146.

FIG. 6 shows the forward portion of the wing 126 of FIG. 5 oriented at an increased wing angle of attack 128 relative to FIG. 5. The increased wing angle of attack 128 in FIG. 6 results in the tangent trajectories 142 of the water droplets 406 impinging at different locations on the wing leading edge 130 relative to the impingement locations in FIG. 5. In this regard, the increased wing angle of attack 128 results in a combination lowering and forward shifting of the suction side water impingement limit 144, and a combination lowering and aftward shifting of the pressure side water impingement limit 146 relative to the location of the suction side water impingement limit 144 and pressure side water impingement limit 146 of FIG. 5. Correspondingly, the surface distance Ss in FIG. 6 is shorter than in FIG. 5, and the surface distance Sp in FIG. 6 is longer than in FIG. 5.

FIG. 7 shows the forward portion of the wing 126 of FIG. 5 at a wing angle of attack 128 of 0° and illustrating the shape and size of ice accretion 148 forming on the wing leading edge 130. The ice accretion 148 forms between a suction side ice accretion limit 152 and a pressure side ice accretion limit 154, which respectively correspond to the location of the suction side water impingement limit 144 and pressure side water impingement limit 146 of FIG. 5. The ice accretion 148 has ice horns 150 that protrude into the freestream flow 132 and disrupt the air flowing over the airfoil 110. For example, the ice accretion 148 with ice horns 150 in FIG. 5 may result in a flow separation bubble (not shown) on the suction side 136 downstream of the leading edge, which may lower the angle of attack at which the wing 126 stalls (i.e., the stall angle 612—FIG. 9) relative to the stall angle 612 (FIG. 9) of the same wing 126 with no ice accretion. In addition, as mentioned above, the ice accretion 148 may reduce the maximum lift coefficient 610 (FIG. 9) and generate aerodynamic drag.

FIG. 8 shows the wing 126 of FIG. 7 at an increased angle of attack (i.e., in the upward direction), resulting in a downward shifting of the location of ice accretion 148 on the wing leading edge 130 relative to the ice accretion 148 in FIG. 7. The increased wing angle of attack 128 results in a combination lowering and forward shifting of the suction side ice accretion limit 152, and a combination lowering and aftward shifting of the pressure side ice accretion limit 154 relative to the location of the suction side ice accretion limit 152 and pressure side ice accretion limit 154 of FIG. 7 Depending on the amount by which the angle of attack of the wing 126 is increased, the combination lowering and forward shifting of the suction side ice accretion limit 152 and the combination lowering and aftward shifting of the pressure side ice accretion limit 154 may result in ice accretion 148 being located in a more favorable part of the pressure gradient along the surface of the wing leading edge 130, and/or may reduce the size of ice horns 150 or may avoid the formation of ice horns 150, which may reduce the disruption of air flowing over the wing 126. The pressure gradient occurs as a result of airflow over the curved surfaces of the wing 126. A more favorable location of ice accretion 148 relative to the pressure gradient may be along or adjacent to the forwardmost portion of the wing leading edge 130.

Figure 9:
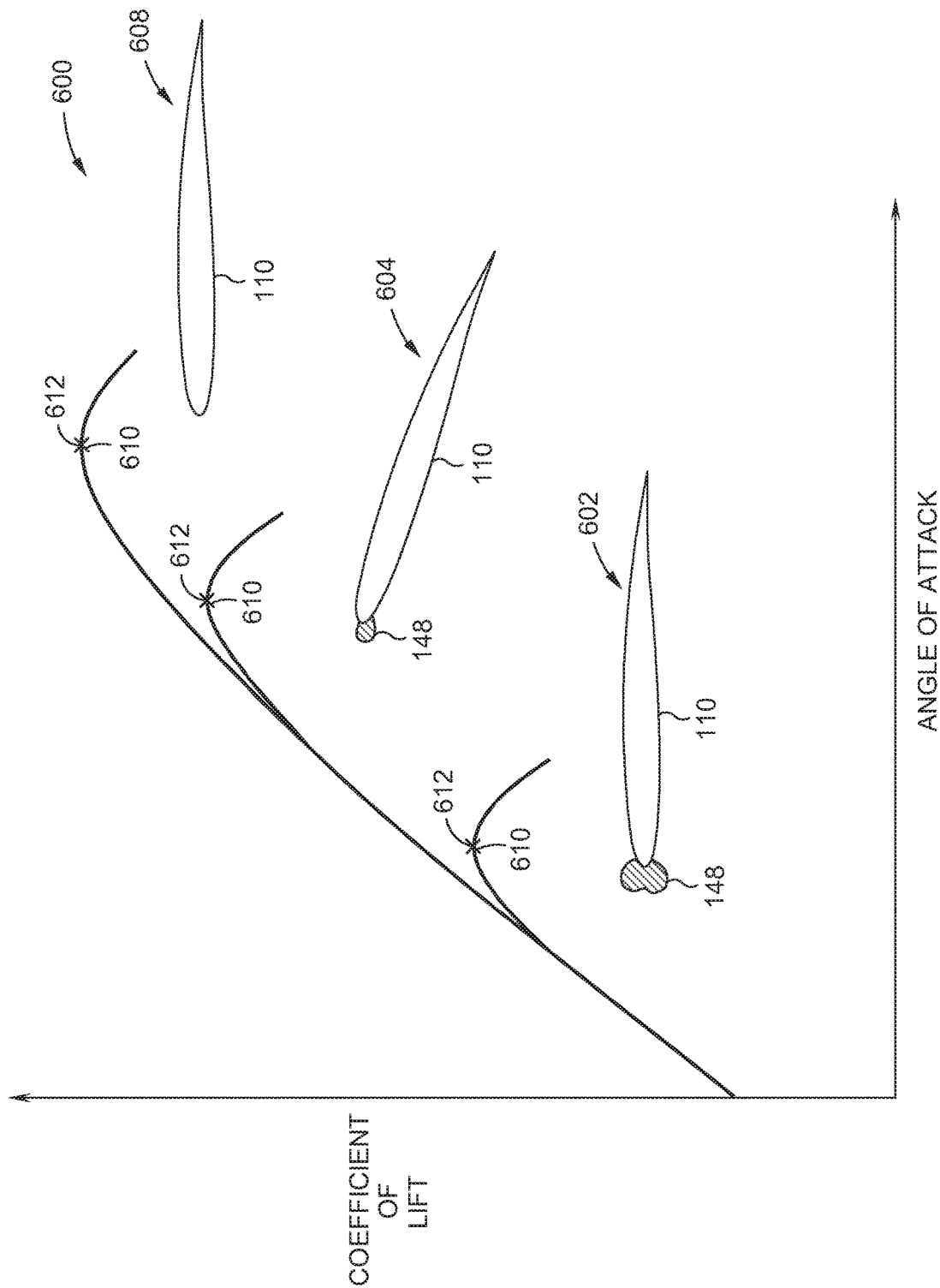
FIG. 9 is a graph of coefficient of lift vs. angle of attack for the same airfoil in three different states including: (1) increased ice accretion resulting from water impingement limits associated with a relatively small angle of attack (e.g., 0°), (2) reduced ice accretion resulting from water impingement limits associated with a relatively larger angle of attack, and (3) a clean condition without ice accretion.

FIG. 9 is a graph 600 of coefficient of lift vs. angle of attack for the same airfoil 110 corresponding to three different states including: (1) a first state 602 in which the airfoil 110 is oriented at a relatively small angle of attack (e.g., 0°) and having ice accretion 148 due to exposure to icing conditions, (2) a second state 604 in which the airfoil 110 is oriented at a relatively large angle of attack and also having ice accretion 148 due to exposure to the same icing conditions as in the first state 602, and (3) a third state 608 in which the airfoil 110 is in a clean condition as a result of non-exposure to icing conditions. As can be seen, the maximum lift coefficient 610 for the airfoil 110 in the second state 604 is lower than the maximum lift coefficient 610 for the airfoil 110 in the third state 608 due to the ice accretion 148 on the leading edge in the second state 604. In addition, the stall angle 612 for the airfoil 110 in the second state 604 is lower than the stall angle 612 of the airfoil 110 in the third state 608. However, the maximum lift coefficient 610 and the stall angle 612 for the airfoil 110 in the second state 604 is higher than the maximum lift coefficient 610 and stall angle 612 for the airfoil 110 in the first state 602 as a result of a lower location of ice accretion 148 on the leading edge of the airfoil 110 in the second state 604 relative to a higher location of ice accretion 148 on the leading edge of the airfoil 110 in the first state 602.

Advantageously, the shift in the location of ice accretion 148 (FIG. 9) provided by the presently-disclosed system 500 (FIG. 1) and method 700 (FIG. 19) such as during cruise or holding of an aircraft (FIG. 2) allows for increased lift and a higher stall angle 612 (FIG. 9) at low airspeeds such as during approach. The relative increase in lift and stall angle 612 improves airplane performance by allowing for increased maximum landing weight for an equivalent approach speed or, conversely, a decreased approach speed for an equivalent maximum landing weight. In addition, the relative increase in lift and stall angle 612 allows for increased approach climb limit weights for an equivalent airspeed. The increased lift and stall angle 612 provided by the system 500 and method 700 also increases airplane safety by increasing the operating margin to stall. Furthermore, the system 500 and method 700 reduces the need for ice protection hardware such as by reducing anti-ice requirements for an equivalent approach speed. In addition, the system 500 and method 700 simplifies the icing conditions certification process for determining critical ice accretion 148 (FIG. 9). In addition, the system 500 and method 700 increase airline service reliability by increasing the safety and efficiency to certify aircraft for operation in the most severe icing conditions such as the FAR Part 25, Appendix 0, SLD (and foreign equivalents) icing conditions discussed above.

Figure 10:
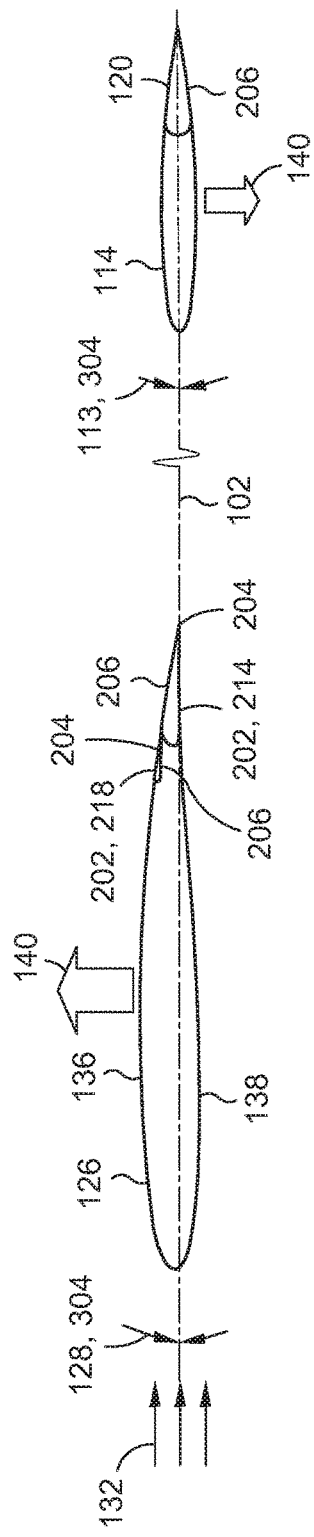
FIG. 10 is a section view of a wing and a horizontal stabilizer oriented respectively at a wing angle of attack of 0° and a stabilizer angle of attack of 0°.
Figure 13:
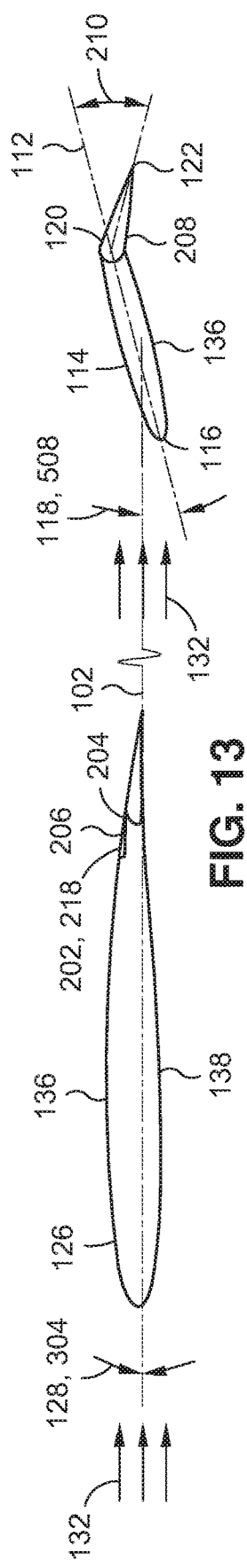
FIG. 13 is a section view of the wing and horizontal stabilizer and elevator of FIG. 10 showing the downward deflection of the stabilizer leading edge of the horizontal stabilizer and the downward deflection of the elevator trailing edge of the elevator in a manner resulting in a downward increase in the stabilizer angle of attack without changing the wing angle of attack.

FIG. 10 is a section view of a wing 126 and a horizontal stabilizer 114 and elevator 120 in a baseline configuration of an aircraft 100 (FIGS. 2-3). In FIG. 10, the wing 126 is oriented at a current angle of attack 304 (i.e., a wing angle of attack 128) of 0° relative to the freestream flow 132 direction which, in FIGS. 10 and 13, is assumed to be parallel to the longitudinal axis 102 of the aircraft 100. In addition, the horizontal stabilizer 114 is oriented at a current angle of attack 304 (i.e., a stabilizer angle of attack 118) of 0° relative to the freestream flow 132 direction. The wing 126 is assumed to generate lift 140 in an upward direction and the horizontal stabilizer 114 is assumed to generate lift 140 in a downward direction in a manner maintaining trimmed, level flight.

In any one of the examples disclosed herein, as described above with reference to FIG. 1, the flight control computer 502 receives data representative of the environmental parameters 402 (e.g., air temperature 404, droplet size 408, liquid water content 410) sensed in the environment 400 (FIG. 2) of the flight path 156 (FIG. 2) of an aircraft 100. The flight control computer 502 may determine, based at least on the environmental parameters 402 and optionally using the activation logic 504, the existence of icing conditions to which the aircraft 100 is currently subjected or is predicted to be subjected. The flight control computer 502 also generates, based on the determination of the existence of icing conditions, a command signal 512 for actuating at least one movable surface 202 of the aircraft 100 for increasing the angle of attack of an airfoil 110 (FIG. 2) in a manner modifying the water impingement limits 144, 146 (FIGS. 5-6) of the airfoil 110.

Referring again to FIG. 1, in addition to receiving data representative of environmental parameters 402 and determining the existence of icing conditions, in some examples, the flight control computer 502 is configured to receive data representative of a current angle of attack 304 of the airfoil 110 (FIG. 2), calculate, using angle of attack selection logic 506 of the flight control computer 502, a target angle of attack 508 (FIG. 2) of the airfoil 110 based on the icing conditions, and determine an angle of attack differential between the current angle of attack 304 (FIG. 10) and the target angle of attack 508 (FIGS. 11-15). Upon determining the angle of attack differential, the flight control computer 502 is configured to generate a command signal 512 representative of the angle of attack differential. One or more surface actuators 200 are configured to receive the command signal 512 from the flight control computer 502, and adjust one or more movable surfaces 202 by an amount causing the angle of attack of the airfoil 110 to increase by an amount equal to the angle of attack differential to thereby bring the airfoil 110 into alignment with the target angle of attack 508 to thereby modify the water impingement limits 144, 146 (FIGS. 5-6) on the airfoil 110.

Furthermore, in some examples, the flight control computer 502 is configured to calculate, using the angle of attack selection logic 506, the target angle of attack 508 based on the icing conditions and based on aircraft state data 300. Aircraft state data 300 may include the current airplane configuration such as flap position 312, speedbrake position 314, gear position 316 and thrust setting 318, and may also include airspeed 306, altitude 308, gross weight 310, location of the center of gravity (not shown) relative to the center of lift (not shown), and other aircraft state data 300. Flap position 312 data may include a flap setting such as on a flap control console (not shown) on a flight deck of an aircraft 100 (FIG. 2). The flap position 312 may include an up position (e.g., flaps fully retracted for cruise flight), a hold position, a climb or approach position, a takeoff or go-around position, and a landing position (e.g., flaps fully extended). An increasingly extended flap position 312 may increase the nose-down pitching moment of the aircraft 100, and may result in the flight control computer 502 compensating in the command signal 512 to cause increased deflection of the movable surfaces 202 to achieve the target angle of attack 508.

Speedbrake position 314 refers to whether the spoilers 218 (e.g., flight spoilers—FIG. 3) are retracted or deployed and, if deployed, the angle of deployment. Spoilers 218 that are partially deployed may increase the nose-down pitching moment and may result in the flight control computer 502 compensating in the command signal 512 to cause increased deflection of the movable surfaces 202 to achieve the target angle of attack 508. Gear position 316 refers to whether the landing gear (not shown) is up or down. Landing gear in the down position generates increased aerodynamic drag and a nose-down pitching moment due to the location of the aerodynamic drag underneath the wings 126 (FIG. 2), and may result in the flight control computer 502 compensating in the command signal 512 to cause increased deflection of the movable surfaces 202 to achieve the target angle of attack 508. For propulsion units 108 (FIG. 2) located underneath the wings 126, an increased thrust setting 318 may generate a nose-up pitching moment causing the flight control computer 502 to generate a command signal 512 in a manner causing reduced deflection of the movable surfaces 202 to achieve the target angle of attack 508. Increased airspeed 306 may increase the rate of ice accretion 148 (FIG. 7-8) and may correspond to increased severity of icing conditions, resulting in the flight control computer 502 compensating in the command signal 512 by commanding increased deflection of the movable surfaces 202 to achieve a higher target angle of attack 508 than for less severe icing conditions. The flight control computer 502 may also factor in the altitude 308, gross weight 310, and/or location of the center of gravity (not shown) in determining the command signal 512 required for deflecting the movable surfaces 202 in a manner for achieving the target angle of attack 508.

Figure 11:
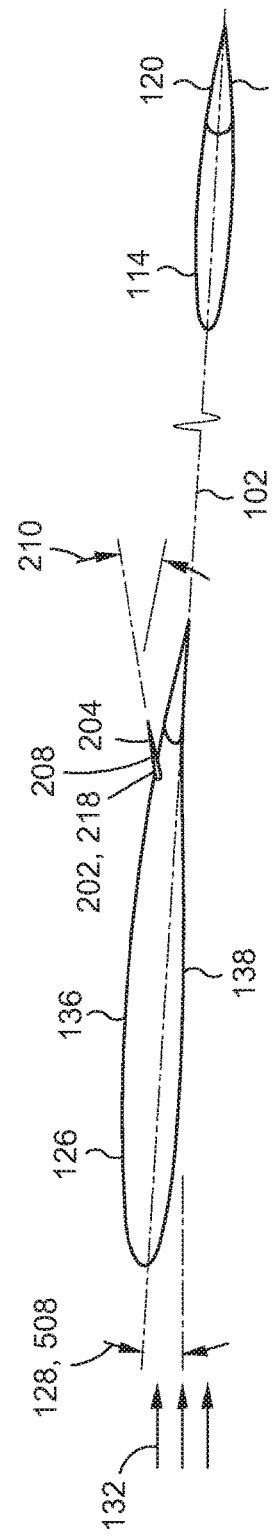
FIG. 11 is a section view of the wing and horizontal stabilizer of FIG. 10 showing the upward deflection of a spoiler causing an upward increase in the wing angle of attack of the wings to thereby cause a modification of the water impingement limits on the wings.

FIG. 11 illustrates an example in which the flight control computer 502 (FIG. 1) generates one or more command signals 512 (FIG. 1) causing one or more surface actuators 200 (FIG. 1) to upwardly deflect the surface trailing edges 204 of at least one laterally symmetric pair of movable surfaces 202 respectively coupled to the pair of wings 126. In some examples, the flight control computer 502 may generate command signals 512 causing the deflection of at least one laterally symmetric pair of flaps 212 (FIG. 3), ailerons 214, and/or spoilers 218. However, one or more laterally symmetric pair of other types of movable surfaces 202 (e.g., flaperons 216—FIG. 3; canards—not shown) may be deflected to cause an increase in the angle of attack of an airfoil 110. In this regard, the present disclosure contemplates deflecting any type of movable surface 202 mounted anywhere on the aircraft 100, and is not limited to deflecting flaps 212, spoilers 218, and/or ailerons 214.

FIG. 11 shows the upward deflection of at least one laterally symmetric pair (FIG. 3) of spoilers 218 from an original position 206 (FIG. 10) through a deflection angle 210 (FIG. 11) to an adjusted position 208 (FIG. 11). In the present disclosure, upward deflection of a movable surface 202 refers to the surface trailing edge 204 moving upwardly. Movable surfaces 202 may be deflected through relatively small deflection angles 210 such as from approximately 0.5-4°, depending upon the severity of the icing conditions and the aircraft state. For icing conditions that are less severe, the flight control computer 502 may calculate deflection angles 210 that are less than 0.5°, and/or the flight control computer 502 may generate command signals 512 for deflecting a single laterally symmetric pair of movable surfaces 202. For icing conditions that are more severe, the flight control computer 502 may calculate deflection angles 210 that are larger than 4°, and/or the flight control computer 502 may generate command signals 512 for deflecting multiple laterally symmetric pairs of movable surfaces 202. In FIG. 11, the deflection of the spoilers 218 causes an upward increase in the wing angle of attack 128 wherein the wing 126 moves from a current angle of attack 304 (FIG. 10) to a target angle of attack 508 (FIG. 11) calculated by the flight control computer 502. The increase in the wing angle of attack 128 causes the above-described combination of lowering and forward shifting of the suction side water impingement limit 144 and corresponding combination of lowering and aftward shifting of the pressure side water impingement limit 146, as illustrated in FIGS. 5-6.

Figure 12:
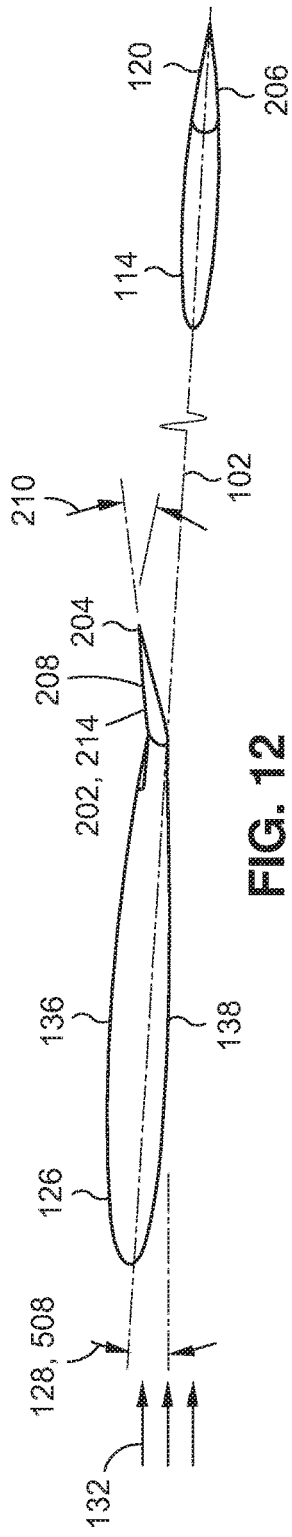
FIG. 12 is a section view of the wing and horizontal stabilizer and elevator of FIG. 10 showing the upward deflection of an aileron causing an upward increase in the wing angle of attack.

FIG. 12 represents the upward deflection of at least one laterally symmetric pair of ailerons 214 from an original position 206 (FIG. 10) through a deflection angle 210 to an adjusted position 208. The upward deflection of the laterally symmetric pair of ailerons 214 causes the wing angle of attack 128 to increase from the current angle of attack 304 (FIG. 10) to the target angle of attack 508. In FIGS. 11-12, the increase in the wing angle of attack 28 increases the pitch angle (not shown) of the aircraft 100. The horizontal stabilizer 114 and elevator 120 in FIGS. 11-12 are at the same orientation relative to the longitudinal axis 102 as in FIG. 10.

FIG. 13 illustrates an example in which the flight control computer 502 (FIG. 1) is configured to generate one or more command signals 512 (FIG. 1) causing one or more surface actuators 200 (FIG. 1) to downwardly deflect the stabilizer leading edge 116 of the pair (FIG. 3) of horizontal stabilizers 114, and downwardly deflect the elevator trailing edge 122 of the elevator 120 (relative to the chord line 112 of the horizontal stabilizer 114) pivotably coupled to each one of the horizontal stabilizers 114. The downward deflection of the stabilizer leading edge 116 causes the stabilizer angle of attack 118 to increase (i.e., relative to the freestream flow 132 direction) in a downward direction from the current angle of attack 304 (FIG. 10) to the target angle of attack 508 (FIG. 13) as calculated by the flight control computer 502. Similar to the above-described effect of increasing the wing angle of attack 128 in an upward direction, increasing the stabilizer angle of attack 118 in a downward direction causes a combination raising and forward shifting of a suction side water impingement limit 144 (not shown) on the suction side 136 (i.e., on the lower surface) of the horizontal stabilizer 114, and a corresponding combination of lowering and aftward shifting of the pressure side water impingement limit 146 (not shown) on the pressure side 138 (i.e., on the upper surface) of the horizontal stabilizer 114. The shifting of the suction side water impingement limit 144 and pressure side water impingement limit 146 on the stabilizer leading edge 116 shifts the location of ice accretion 148 (not shown) on the stabilizer leading edge 116, which reduces aerodynamic drag and reduces the extent of disruption of airflow over the horizontal tail (i.e., the horizontal stabilizer 114 and elevator 120) to thereby improve the ability of the horizontal tail to generate a downward force (e.g., lift 140—FIG. 10) for counteracting the nose-down pitching moment of the wings 126.

In FIG. 13, the elevator trailing edge 122 may be downwardly deflected in a manner resulting in a downward increase in the stabilizer angle of attack 118 without changing the wing angle of attack 128. In this regard, the flight control computer 502 (FIG. 1) may generate command signals 512 causing the elevator trailing edge 122 to be downwardly deflected from an original position 206 (FIG. 10) through a deflection angle 210 to an adjusted position 208 that maintains the wing 126 at substantially (e.g., within 10 percent) the same wing angle of attack 128 as prior to the adjustment of the horizontal stabilizer 114 and elevator 120. In addition, the flight control computer 502 may generate command signals and 512 to adjust the orientation of the horizontal stabilizer 114 and elevator 120 in a manner maintaining the altitude 308 (FIG. 1) of the aircraft 100. In any one of the examples disclosed herein, the flight control computer 502 may increase a thrust setting 318 (FIG. 1) of one or more propulsion units 108 (FIG. 3) of the aircraft 100 in a manner maintaining the aircraft 100 at an airspeed 306 (FIG. 1) and/or an altitude 308 that is substantially equivalent (e.g., within 20 percent) to the airspeed 306 and altitude 308 of the aircraft 100 prior to adjusting one or more movable surfaces 202 (e.g., flaps 212, ailerons 214, flaperons 216, spoilers 218, horizontal stabilizers 114, elevators 120, etc.) and increasing the angle of attack of one or more airfoils 110 (e.g., wings 126, horizontal stabilizers 114) for purposes of modifying the water impingement limits 144, 146.

Figure 14:
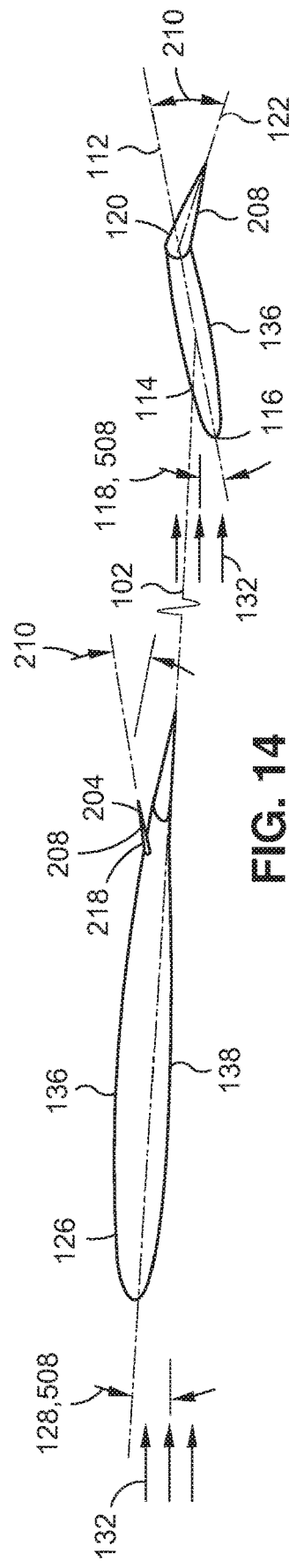
FIG. 14 is a section view of the wing and horizontal stabilizer and elevator of FIG. 10 showing the downward deflection of the horizontal stabilizer and the downward deflection of the elevator with simultaneous upward deflection of the surface trailing edge of the spoiler in a manner resulting in a downward increase in the stabilizer angle of attack and an upward increase in the wing angle of attack.

FIG. 14 illustrates an example in which the flight control computer 502 (FIG. 1) generates one or more command signals 512 (FIG. 1) causing one or more surface actuators 200 (FIG. 1) to downwardly deflect the stabilizer leading edge 116 and downwardly deflect the elevator trailing edge 122 of the elevator 120 similar to that described above in FIG. 13, while causing other surface actuators 200 (FIG. 1) to upwardly deflect at least one laterally symmetric pair of movable surfaces 202 respectively coupled to the pair of wings 126 in a manner increasing the stabilizer angle of attack 118 in a downward direction (relative to the freestream flow 132 direction) and increasing the wing angle of attack 128 in an upward direction (relative to the freestream flow 132 direction).

FIG. 14 illustrates the downward deflection of the horizontal stabilizer 114 and the downward deflection of the elevator 120 with simultaneous upward deflection of the surface trailing edge 204 of a spoiler 218 from an original position 206 (FIG. 13) through a deflection angle 210 to an adjusted position 208, resulting in a downward increase in the stabilizer angle of attack 118 and an upward increase in the wing angle of attack 128. The downward increase in the stabilizer angle of attack 118 and the upward increase in the wing angle of attack 128 each modifies the water impingement limits 144, 146 (FIGS. 5-6) on the stabilizer leading edge 116 and wing leading edge 130 which advantageously reduces the effects of ice accretion 148 (e.g., FIG. 7-8) on air flow over the horizontal stabilizers 114 and wings 126.

Figure 15:
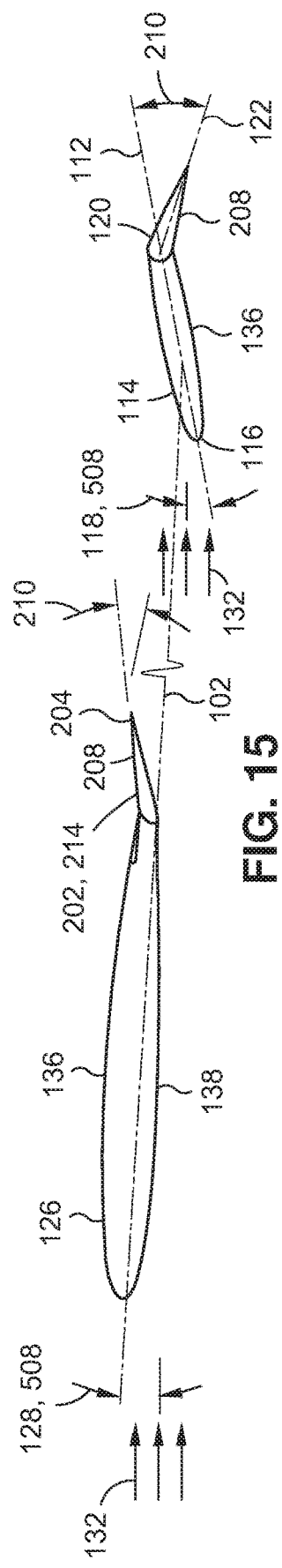
FIG. 15 is a section view of the wing and horizontal stabilizer and elevator of FIG. 10 showing the downward deflection of the horizontal stabilizer and the downward deflection of the elevator with simultaneous upward deflection of the surface trailing edge of the aileron in a manner resulting in a downward increase in the stabilizer angle of attack and an upward increase in the wing angle of attack.

FIG. 15 illustrates the downward deflection of the horizontal stabilizer 114 and the downward deflection of the elevator 120 with simultaneous upward deflection of the surface trailing edge 204 of an aileron 214 to achieve a downward increase in the stabilizer angle of attack 118 (relative to the freestream flow 132 direction) and an upward increase in the wing angle of attack 128 (relative to the freestream flow 132 direction). Similar to the above-described configuration of FIG. 14, the downward increase in the stabilizer angle of attack 118 and the upward increase in the wing angle of attack 128 modifies the water impingement limits 144, 146 (FIGS. 5-6) on the stabilizer leading edge 116 and wing leading edge 130.

FIG. 16 illustrates an example in which the flight control computer 502 (FIG. 1) generates one or more command signals 512 (FIG. 1) causing one or more surface actuators 200 (FIG. 1) to upwardly deflect the stabilizer leading edge 116 and upwardly deflect the elevator trailing edge 122 in a manner resulting in an upward increase in the stabilizer angle of attack 118. The upward increase in the stabilizer angle of attack 118 biases the water impingement limits 144, 146 (not shown) on the horizontal stabilizer 114 more toward the suction side 136, and is therefore more adverse for the ice accretion limits 152, 154 (not shown) on the horizontal stabilizer 114. However, upwardly increasing the stabilizer angle of attack 118 may be advantageous for aircraft 100 (FIG. 16) that have a reduced amount of elevator 120 authority in the nose-down direction in icing conditions. By adjusting the stabilizer angle of attack 118 to an upward direction (relative to the freestream flow 132 direction) and by correspondingly increasing the deflection angle of the elevator trailing edge 122, the horizontal tail may maintain the aircraft 100 in trimmed flight while maintaining nose-down authority of the elevator 120 (e.g., to meet certification requirements).

FIG. 17 illustrates an example similar to FIG. 16 in which the flight control computer 502 (FIG. 1) generates one or more command signals 512 (FIG. 1) causing surface actuators 200 (FIG. 1) to upwardly deflect the stabilizer leading edge 116 and upwardly deflect the elevator trailing edge 122 by an amount resulting in an upward increase in the wing angle of attack 128 in addition to the upward increase in the stabilizer angle of attack 118. The upward increase in the wing angle of attack 128 improves the water impingement limits 144, 146 (FIGS. 5-6) on the wing leading edge 130 in a manner as described above. As described above with regard to FIG. 16, although an upward increase in the stabilizer angle of attack 118 is more adverse for the ice accretion limits 152, 154 (not shown) on the horizontal stabilizer 114, upwardly increasing the stabilizer angle of attack 118 may be advantageous in icing conditions in which the horizontal stabilizer 114 has reduced elevator 120 authority in the nose-down direction.

Figure 18:
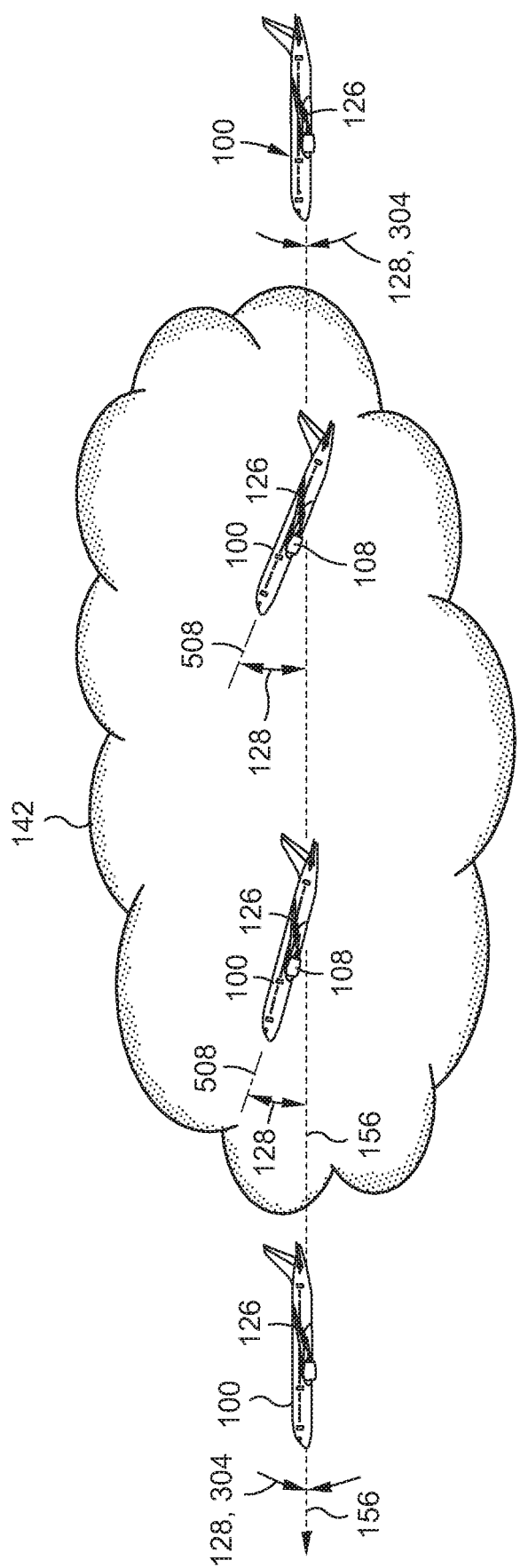
FIG. 18 is an illustration of an aircraft on a flight path through a cloud containing icing conditions and showing a temporary increase in the wing angle of attack while the aircraft passes through the cloud while maintaining the altitude of the aircraft.

FIG. 18 shows an aircraft 100 on a flight path 156 through a cloud 412 containing icing conditions. FIG. 18 illustrates a temporary increase in the wing angle of attack 128 (shown exaggerated) as the aircraft 100 passes through the cloud 412 while maintaining the same altitude 308 (FIG. 1) as prior to entering the cloud 412. As described above, temporarily increasing the wing angle of attack 128 of the aircraft 100 modifies the water impingement limits 144, 146 (FIGS. 5-6) on the wing leading edges 130 (FIGS. 5-6) which advantageously reduce the effects of ice accretion 148, as shown in the graph of FIG. 9. In some examples, the flight control computer 502 (FIG. 1) may continuously monitor the environmental parameters 402 (FIG. 1) to determine whether icing conditions continue to exist. Upon determining that icing conditions no longer exist, the flight control computer 502 may autonomously (i.e., without human intervention) command the movable surfaces 202 (FIG. 1) from the adjusted position 208 (FIG. 11) back to the original position 206 (FIG. 10). Alternatively or additionally, the flight control computer 502 may at any time allow pilot input 514 (FIG. 1) for commanding the movable surfaces 202 (FIG. 1) to move from the adjusted position 208 back to the original position 206.

Referring to FIG. 19, shown is a flow chart of operations included in a method 700 of modifying the location of the water impingement limits 144, 146 of an airfoil 110. Step 702 of the method 700 includes sensing environmental parameters 402 in the environment 400 of the flight path 156 of an aircraft 100. As described above, the environmental parameters 402 may include air temperature 404 and droplet size 408 of water dropped. In addition, the environmental parameters 402 may also liquid water content 410, altitude 308, horizontal extent and/or vertical extent of icing conditions, and other environmental parameters 402. Step 702 may also include sensing the aircraft surface temperatures 302 to determine the existence of icing additions if aircraft surface temperatures 302 are below 0° C., as described above.

Step 704 of the method 700 includes determining, based on the environmental parameters 402, the existence of icing conditions. As mentioned above, the step of determining the existence of icing conditions may include determining the current existence of icing conditions, or determining the existence of icing conditions to which the aircraft 100 is predicted to be subjected at a later point along the flight path 156 of the aircraft 100. The existence of icing conditions may be determined by ground-based or airborne weather measurement instrumentation. The determination of icing conditions may also be based on reports of icing conditions by pilots of other aircraft in areas near the flight path 156.

Step 706 of the method 700 (FIG. 19) includes adjusting, in response to determining the existence of icing conditions, at least one movable surface 202 of the aircraft 100. The movable surface 202 may be moved from an original position 206 through a deflection angle 210 to an adjusted position 208. In the present disclosure, the original position 206 of a movable surface 202 is the position immediately prior to changing the orientation of the movable surface 202 to achieve the target angle of attack 508 of an airfoil 110.

Step 708 of the method 700 includes increasing the angle of attack of an airfoil 110 (e.g., the wings 126, the horizontal stabilizers 114) in response to adjusting the movable surface 202 to thereby cause a modification of the water impingement limit 144, 146 on the airfoil 110. As described above, an increase in the wing angle of attack 128 causes a combination lowering and forward shifting of a suction side water impingement limit 144 on the suction side 136 (i.e., the upper surface) of the wings 126 and a combination lowering and aftward shifting of the pressure side water impingement limit 146 on the pressure side 138 (i.e., the lower surface) of the wings 126.

In some examples, the method 700 (FIG. 19) may include determining a current angle of attack 304 of the airfoil 110, calculating a target angle of attack 508 of the airfoil 110 based on the icing conditions, and determining an angle of attack differential between the current angle of attack 304 and the target angle of attack 508. In such examples, step 706 may include adjusting at least one movable surface 202 by an amount causing the angle of attack of the airfoil 110 to increase by an amount equal to the angle of attack differential to thereby bring the airfoil 110 into alignment with the target angle of attack 508, as described above.

The step of calculating the target angle of attack 508 may include calculating the target angle of attack 508 based on the icing conditions and based on aircraft state data 300 such as current flap position 312, speedbrake position 314, airspeed 306, altitude 308, thrust setting 318, gear position 316, and/or other aircraft state data 300, as described above. In this regard, step 704 of determining the existence of icing conditions may include determining the severity of the icing conditions based at least on air temperature 404 and droplet size 408 of water droplets 406 in the environment 400 of the aircraft 100. As mentioned above, the lower the air temperature 404 and/or the larger the droplet size 408, the more severe the icing condition. In this regard, the longer that the aircraft 100 is exposed to water droplets 406 in liquid form existing in air temperatures 404 below 0° C., the more severe the icing condition. Similarly, the higher the liquid water content 410 of the cloud 412, the more severe the icing condition. The step of calculating the target angle of attack 508 may be based on the severity of icing conditions. For example, the more severe the icing addition, the larger the target angle of attack 508 of the airfoil 110. In this regard, step 706 may comprise adjusting the movable surface 202 by an amount proportional to the severity of the icing conditions.

Referring briefly to FIGS. 11-12, in some examples, the step 706 of adjusting the movable surface 202 may comprise upwardly deflecting a surface trailing edge 204 of at least one laterally symmetric pair of movable surfaces 202 respectively coupled to a pair of wings 126 respectively located on laterally opposite sides of the aircraft centerline 104. For example, upwardly deflecting a laterally symmetric pair of movable surfaces 202 may include upwardly deflecting a surface trailing edge 204 of a laterally symmetric pair of flaps 212, spoilers 218, and/or ailerons 214. In such cases, step 708 of increasing the angle of attack of the airfoil 110 may comprise increasing the wing angle of attack 128 in response to upwardly deflecting the laterally symmetric pair of flaps 212, spoilers 218, and/or ailerons 214.

Referring briefly to FIGS. 13-15, in some examples, the step 706 of adjusting the movable surface 202 may comprise downwardly deflecting a stabilizer leading edge 116 of a horizontal stabilizer 114 and downwardly deflecting an elevator trailing edge 122 of an elevator 120 such that the stabilizer leading edge 116 of the horizontal stabilizer 114 moves downwardly and the elevator trailing edge 122 of the elevator 120 moves downwardly as shown in FIGS. 13-15. In such cases, step 708 of increasing the angle of attack of the airfoil 110 comprises increasing the stabilizer angle of attack 118 in a downward direction in response to downwardly deflecting the stabilizer leading edge 116. In some examples such as in FIG. 13, the downward deflection of the stabilizer leading edge 116 and downward deflection of the elevator trailing edge 122 may be performed in a manner such that the wing angle of attack 128 remains unchanged. As mentioned above, increasing the stabilizer angle of attack 118 in the downward direction may cause a combination raising and forward shifting of a suction side water impingement limit 144 (not shown) on the suction side 136 (e.g., the lower surface) of the horizontal stabilizer 114 and correspondingly a combination lowering and aftward shifting of the pressure side water impingement limit 146 (not shown) on the pressure side 138 (e.g., the upper surface) of the horizontal stabilizer 114.

Referring briefly to FIGS. 14-15, in some examples, the step 706 of adjusting the movable surface 202 may comprise downwardly deflecting the stabilizer leading edge 116 and downwardly deflecting the elevator trailing edge 122 while upwardly deflecting a surface trailing edge 204 of at least one laterally symmetric pair of movable surfaces 202 respectively coupled to a pair of wings 126 respectively located on laterally opposite sides of the aircraft 100. For example, FIGS. 14-15 illustrate the downward deflection of the stabilizer leading edge 116 and the downward deflection of the elevator trailing edge 122 with simultaneous upward deflection of at least one laterally symmetric pair of spoilers 218 (FIG. 14) and/or ailerons 214 (FIG. 15). In such cases, step 708 of increasing the angle of attack of the airfoil 110 comprises increasing the stabilizer angle of attack 118 in a downward direction and increasing the wing angle of attack 128 in an upward direction in response to downwardly deflecting the horizontal stabilizer 114 and downwardly deflecting the elevator 120 and upwardly deflecting at least one laterally symmetric pair of movable surfaces 202 (e.g., spoilers 218, ailerons 214, flaps 212, flaperons 216, etc.) of the wings 126.

Referring briefly to FIGS. 16-17, in some examples, the step 706 of adjusting the movable surface 202 may comprise upwardly deflecting the stabilizer leading edge 116 of the horizontal stabilizer 114 and upwardly deflecting the elevator trailing edge of the elevator 120. For example, FIG. 16 illustrates the upward deflection of the stabilizer leading edge 116 and the upward deflection of the elevator trailing edge 122. In such cases, step 708 of increasing the angle of attack of the airfoil 110 comprises increasing the stabilizer angle of attack 118 in an upward direction in response to upwardly deflecting the stabilizer leading edge 116 to thereby maintain nose-down authority of the elevator 120 in icing conditions with ice accretion (not shown) on the horizontal stabilizer 114, as described above. FIG. 17 illustrates an example similar to FIG. 16, with the exception that the stabilizer leading edge 116 and the elevator trailing edge 122 in FIG. 17 are both deflected upwardly by an amount to increase the wing angle of attack 128 in an upward direction to thereby improve the water impingement limits 144, 146 (FIGS. 5-6) on the wing leading edge 130. Similar to the example of FIG. 16, the horizontal stabilizer 114 and the elevator 120 in FIG. 17 may be deflected upwardly in a manner maintaining the aircraft 100 in trimmed flight while retaining nose-down authority of the elevator 120 in icing conditions.

In any of the examples disclosed herein, the method 700 (FIG. 19) may further comprise increasing the thrust setting 318 of one or more propulsion units 108 (FIG. 3) of the aircraft 100 in a manner maintaining the airspeed 306 and/or the altitude 308 of the aircraft 100 to be substantially (e.g., within 20 percent) equivalent to the airspeed 306 and the altitude 308 of the aircraft 100 prior to adjusting the one or more movable surfaces 202 for increasing the angle of attack of one or more airfoils 110. In addition, the method 700 (FIG. 19) may optionally include continuously monitoring the environmental parameters 402 to determine whether icing conditions continue to exist, and autonomously commanding the one or more movable surface 202 to move back to the original position 206 of the movable surfaces 202 when icing conditions cease to exist. For example, the autonomous commanding may be performed by a flight control computer 502 upon determining that icing conditions no longer exist.

FIG. 18 illustrates an example of an aircraft 100 on a flight path 156 that passes through a cloud 412 containing icing conditions. Prior to entering the cloud 412, the wings 126 are oriented at a current angle of attack 304. Prior to or immediately upon entering the cloud 412, one or more movable surfaces 202 (FIG. 11) may be autonomously or manually commanded to be deflected in a manner causing the wing angle of attack 128 to increase from the current angle of attack 304 to a target angle of attack 508. Autonomous commanding of the movable surfaces 202 may be performed by the activation logic 504 (FIG. 1) of a flight control computer 502 (FIG. 1) upon determining the existence of icing conditions. Manual commanding of the movable surfaces 202 may be performed by pilot input 514 (FIG. 1) in which a member of the flight crew initiates the activation logic 504 (FIG. 1) of the flight control computer 502. A pilot or other flight crew member may determine the existence of icing conditions by visually observing water drops on the aircraft surfaces, in combination with the pilot or flight crew member determining that the air temperature 404 (e.g., the outside air temperature) and/or the aircraft surface temperature 302 (e.g., of the wings 126) are at or below 0° C.

In the example of FIG. 18, the wings 126 may be maintained at a target angle of attack 508 while the aircraft 100 is subjected to the icing additions (e.g., within the cloud 412). Upon exiting the icing conditions, the movable surfaces 202 may be autonomously or manually commanded to return to their original position 206, causing the wing 126 to be reoriented back to the same angle of attack as prior to entering the icing conditions. As the movable surfaces 202 are deflected and the angle of attack of the wings 126 is temporarily increased, the aircraft 100 may be maintained at the same altitude 308 by temporarily adjusting (e.g., increasing) the thrust setting 318 (FIG. 1) of the propulsion units 108 to compensate for the increased aerodynamic drag generated by the temporary deflection of the movable surfaces 202 (FIG. 11) and/or by the increase in the angle of attack of the airfoils the wings 126 for the time period when the aircraft 100 is subjected to the icing conditions.

Many modifications and other configurations of the disclosure will come to mind to one skilled in the art, to which this disclosure pertains, having the benefit of the teachings presented in the foregoing descriptions and the associated drawings. The configurations described herein are meant to be illustrative and are not intended to be limiting or exhaustive. Although specific terms are employed herein, they are used in a generic and descriptive sense only and not for purposes of limitation.

What is claimed is:

1. A system for modifying a location of a water impingement limit on an airfoil of an aircraft, the system comprising:
    a flight control computer configured to:
        receive data representative of environmental parameters sensed in an environment of a flight path of an aircraft; and
        determine, based on the environmental parameters, an existence of icing conditions to which the aircraft is currently subjected or is predicted to be subjected; and
        generate, based on the existence of icing conditions, a command signal for actuating a movable surface of the aircraft;
    a surface actuator configured to receive the command signal from the flight control computer and adjust the movable surface in a manner causing an increase in an angle of attack of the airfoil to thereby modify a location of a water impingement limit on the airfoil; and
    the flight control computer configured to temporarily adjust a thrust setting of a propulsion unit of the aircraft in a manner to maintain an altitude of the aircraft if the increase in the angle of attack would otherwise cause a change in the altitude.

2. The system of claim 1, wherein:
    the flight control computer is configured to determine the existence of icing conditions based on the environmental parameters and based on aircraft state data including aircraft surface temperature.

3. The system of claim 1, wherein:
    the flight control computer is configured to:
        receive data representative of a current angle of attack of the airfoil;
        calculate a target angle of attack of the airfoil based on the icing conditions; and
        determine an angle of attack differential between the current angle of attack and the target angle of attack; and
    the surface actuator is configured to adjust the movable surface by an amount causing the angle of attack of the airfoil to increase by an amount equal to the angle of attack differential to thereby bring the airfoil into alignment with the target angle of attack.

4. The system of claim 3, wherein:
    the flight control computer is configured to calculate the target angle of attack based on the icing conditions and based on aircraft state data including at least one of flap position, speedbrake position, airspeed, altitude, thrust setting, and gear position.

5. The system of claim 1, wherein:
    the airfoil comprises a pair of wings; and
    the flight control computer is configured to generate one or more command signals causing one or more surface actuators to upwardly deflect at least one laterally symmetric pair of movable surfaces respectively coupled to the pair of wings to thereby increase a wing angle of attack in an upward direction.

6. The system of claim 1, wherein:
    the flight control computer is configured to generate one or more command signals causing one or more surface actuators to upwardly deflect a laterally symmetric pair of at least one of flaps, spoilers, and ailerons.

7. The system of claim 1, wherein:
    the airfoil comprises a horizontal stabilizer; and
    the flight control computer is further configured to generate one or more command signals causing one or more surface actuators to downwardly deflect a stabilizer leading edge of the horizontal stabilizer and downwardly deflect an elevator trailing edge of an elevator pivotably coupled to the horizontal stabilizer to thereby increase a stabilizer angle of attack of the horizontal stabilizer in a downward direction.

8. The system of claim 1, wherein:
    the airfoil comprises a horizontal stabilizer; and
    the flight control computer is further configured to generate one or more command signals causing one or more surface actuators to upwardly deflect a stabilizer leading edge of the horizontal stabilizer and upwardly deflect an elevator trailing edge of an elevator pivotably coupled to the horizontal stabilizer to thereby increase a stabilizer angle of attack in an upward direction to maintain nose-down authority of the elevator in icing conditions.

9. The system of claim 1, wherein:
    the airfoil comprises a pair of wings and a horizontal stabilizer; and
    the flight control computer is configured to generate one or more command signals causing one or more surface actuators to downwardly deflect a stabilizer leading edge of the horizontal stabilizer and downwardly deflect an elevator trailing edge of an elevator pivotably coupled to the horizontal stabilizer while causing another one or more surface actuators to upwardly deflect at least one laterally symmetric pair of movable surfaces respectively coupled to the pair of wings in a manner increasing a stabilizer angle of attack of the horizontal stabilizer in a downward direction and increasing a wing angle of attack of the pair of wings in an upward direction.

10. The system of claim 1, wherein:
    the flight control computer is configured to determine a severity of the icing conditions based at least on droplet size of water droplets in the environment of the flight path, and generate the command signal proportional to increasing severity of the icing conditions; and
    the surface actuator is configured to adjust, based on the command signal, the movable surface by an amount proportional to increasing severity of the icing conditions.

11. A method of modifying a location of a water impingement limit on a surface of an airfoil of an aircraft, the method comprising:
    sensing environmental parameters in an environment of a flight path of an aircraft;
    determining, using a flight control computer based on the environmental parameters, an existence of icing conditions to which the aircraft is currently subjected or is predicted to be subjected;

adjusting, in response to determining the existence of icing conditions, at least one movable surface of the aircraft;

increasing an angle of attack of the airfoil in response to adjusting the movable surface to thereby cause a modification of a location of a water impingement limit on the airfoil; and temporarily adjusting a thrust setting of a propulsion unit of the aircraft in a manner to maintain an altitude of the aircraft if the increase in the angle of attack would otherwise cause a change in the altitude.

12. The method of claim 11, further comprising:
determining a current angle of attack of the airfoil;
calculating a target angle of attack of the airfoil based on the icing conditions;
determining an angle of attack differential between the current angle of attack and the target angle of attack; and
wherein the step of adjusting the movable surface comprises adjusting the movable surface by an amount causing the angle of attack of the airfoil to increase by an amount equal to the angle of attack differential to thereby bring the airfoil into alignment with the target angle of attack.

13. The method of claim 12, wherein the step of calculating the target angle of attack includes:
calculating the target angle of attack based on the icing conditions and aircraft state data including at least one of flap position, speedbrake position, airspeed, altitude, thrust setting, and gear position.

14. The method of claim 11, wherein the steps of determining the existence of icing conditions and adjusting the movable surface respectively comprise:
determining a severity of the icing conditions based at least on droplet size of water droplets in the environment of the aircraft; and
adjusting the movable surface by an amount proportional to increasing severity of the icing conditions.

15. The method of claim 11, wherein the steps of adjusting the movable surface and increasing the angle of attack of the airfoil respectively comprise:
upwardly deflecting a surface trailing edge of at least one laterally symmetric pair of movable surfaces respectively coupled to a pair of wings respectively located on laterally opposite sides of the aircraft; and
increasing a wing angle of attack of the pair of wings in response to upwardly deflecting the laterally symmetric pair of movable surfaces.

16. The method of claim 15, wherein the step of upwardly deflecting the laterally symmetric pair of movable surfaces comprises:
upwardly deflecting a surface trailing edge of a laterally symmetric pair of at least one of flaps, spoilers, and ailerons.

17. The method of claim 11, wherein the steps of adjusting the movable surface and increasing the angle of attack of the airfoil respectively comprise:
downwardly deflecting a stabilizer leading edge of a horizontal stabilizer and downwardly deflecting an elevator trailing edge of an elevator pivotably coupled to the horizontal stabilizer; and
increasing a stabilizer angle of attack of the horizontal stabilizer in a downward direction in response to downwardly deflecting the stabilizer leading edge of the horizontal stabilizer.

18. The method of claim 11, wherein the steps of adjusting the movable surface and increasing the angle of attack of the airfoil respectively comprise:
upwardly deflecting a stabilizer leading edge of a horizontal stabilizer and upwardly deflecting an elevator trailing edge of an elevator pivotably coupled to the horizontal stabilizer; and
increasing a stabilizer angle of attack of the horizontal stabilizer in an upward direction in response to downwardly deflecting the stabilizer leading edge of the horizontal stabilizer to thereby maintain nose-down authority of the elevator in icing conditions.

19. The method of claim 11, wherein the steps of adjusting the movable surface and increasing the angle of attack of the airfoil respectively comprises:
downwardly deflecting a stabilizer leading edge of a horizontal stabilizer and downwardly deflecting an elevator trailing edge of an elevator pivotably coupled to the horizontal stabilizer while upwardly deflecting a surface trailing edge of at least one laterally symmetric pair of movable surfaces respectively coupled to a pair of wings respectively located on laterally opposite sides of the aircraft; and
increasing a stabilizer angle of attack of the horizontal stabilizer in a downward direction and increasing a wing angle of attack of the pair of wings in an upward direction in response to downwardly deflecting the horizontal stabilizer and downwardly deflecting the elevator and upwardly deflecting the laterally symmetric pair of movable surfaces of the pair of wings.

20. A method of modifying a location of a water impingement limit on a pair of wings on laterally opposite sides of an aircraft, the method comprising:
sensing an air temperature and a droplet size of water droplets in an environment of a flight path of the aircraft;
determining, based on the air temperature and the droplet size, an existence of icing conditions to which the aircraft is currently subjected or is predicted to be subjected;
upwardly deflecting, in response to determining the existence of icing conditions, at least one laterally symmetric pair of movable surfaces respectively coupled to the pair of wings; and
increasing a wing angle of attack of the wings in response to upwardly deflecting the laterally symmetric pair of movable surfaces to thereby cause a forward and downward shift of a water impingement upper limit on an upper surface of the wings and an aftward and downward shift of a water impingement lower limit on a lower surface of the wings.

* * * * *